(12) United States Patent
Pahwa et al.

(10) Patent No.: US 9,064,337 B2
(45) Date of Patent: Jun. 23, 2015

(54) METHOD, SYSTEM AND APPARATUS FOR RENDERING A MAP WITH ADAPTIVE TEXTURES FOR MAP FEATURES

(75) Inventors: Aroon Pahwa, Palo Alto, CA (US); Christopher Blumenberg, San Francisco, CA (US); Marvel Van Os, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 314 days.

(21) Appl. No.: 13/619,430

(22) Filed: Sep. 14, 2012

(65) Prior Publication Data

US 2013/0321443 A1    Dec. 5, 2013

Related U.S. Application Data

(60) Provisional application No. 61/656,002, filed on Jun. 5, 2012.

(51) Int. Cl.
    *G06T 15/04*      (2011.01)
    *G01C 21/36*      (2006.01)
    *G06T 17/05*      (2011.01)

(52) U.S. Cl.
    CPC .............. *G06T 15/04* (2013.01); *G06T 17/05* (2013.01); *G01C 21/367* (2013.01); *G06T 2210/36* (2013.01)

(58) Field of Classification Search
    CPC ... G06T 15/04; G06T 2210/36; G06T 11/001; G01C 21/206; G01C 21/32; G01C 21/26; G01C 21/34; G01C 21/3679; G01C 21/3682; G01C 21/30; G01C 21/367; G06F 17/30241; G06F 17/3087; G09B 29/12; G01S 17/89

USPC .......................................................... 345/587
See application file for complete search history.

(56) References Cited

U.S. PATENT DOCUMENTS

| | | | |
|---|---|---|---|
| 7,643,702 B1 | 1/2010 | Brandt | |
| 7,956,870 B2 | 6/2011 | Snyder et al. | |
| 8,203,552 B2 * | 6/2012 | Ingersoll et al. | 345/419 |
| 2004/0061726 A1 * | 4/2004 | Dunn et al. | 345/855 |
| 2006/0170693 A1 * | 8/2006 | Bethune et al. | 345/568 |
| 2007/0247473 A1 | 10/2007 | Li | |
| 2010/0097388 A1 | 4/2010 | Nystad et al. | |
| 2011/0166783 A1 * | 7/2011 | Ren et al. | 701/212 |
| 2011/0296295 A1 | 12/2011 | Hodges et al. | |

* cited by examiner

*Primary Examiner* — Carlos Perromat
(74) *Attorney, Agent, or Firm* — Robert C. Kowert; Meyertons, Hood, Kivlin, Kowert & Goetzel, P.C.

(57) ABSTRACT

Methods, systems and apparatus are described to render a map with adaptive textures for map features. Embodiments may for a portion of map data, such as a map tile, including a feature of a given feature type specify a level-of-detail texture. A level-of-detail texture may be one of a plurality of level-of-detail textures for a given feature type ordered according to level-of-detail. Embodiments may then provide the specified level-of-detail texture with a mipmap chain to a rendering unit to render the map data. At the lowest level of the mipmap chain may be the specified level-of-detail texture. At the next lowest level of the mipmap chain may be a portion of the level-of-detail texture adjacent to the specified level-of-detail texture in the ordered plurality of level-of-detail textures for the feature type.

25 Claims, 10 Drawing Sheets

METHOD, SYSTEM AND APPARATUS FOR RENDERING A MAP WITH ADAPTIVE TEXTURES FOR MAP FEATURES

This application claims benefit of priority to U.S. Provisional Application Ser. No. 61/656,002, entitled "Method, System And Apparatus For Rendering A Map With Adaptive Textures For Map Features," filed Jun. 5, 2012.

BACKGROUND

Description of the Related Art

Mobile computing is an expanding field of technological development. Advances in mobile communications, mobile hardware, and mobile software applications are continually developing new solutions for existing limitations in the field and providing innovative products for consumers. As part of the growing demand for mobile software applications, map displays and navigation applications provide a user with various forms of maps, navigation, and direction information. Often, map data is manipulated and displayed by mobile devices, such as mobile phones, personal digital assistants, tablet computers, or laptop computers. Interactivity with these applications increases the processing demand on a mobile device which, if not accounted for, may lead to bad user experiences or application failure. To account for an application's demand on a mobile device's resources, application designers may attempt to reduce the size or quantity of transactions necessary to perform mobile software applications.

SUMMARY

Various embodiments of methods, apparatus, and computer-readable storage media for rendering a map with adaptive textures for map features are described. Several embodiments of rendering map data with features are described suitable for display on a computing or portable electronic device. Embodiments may obtain map data from a server. For a portion of the map data including a feature with a given feature type, embodiments may specify a level-of-detail texture for the feature. A level-of-detail texture may be one of a plurality of level-of-detail textures for a given feature type ordered according to level-of-detail. Embodiments may then provide the specified level-of-detail texture with a mipmap chain to a rendering unit to render the map data. At the lowest level of the mipmap chain may be the specified level-of-detail texture. At the next lowest level of the mipmap chain may be a portion of the level-of-detail texture adjacent to the specified level-of-detail texture in the ordered plurality of level-of-detail textures for the feature type. Some embodiments when rendering a feature may blend between the levels of a mipmap chain using spatial information for the feature. In at least some embodiments, a feature may connect from one adjacent map tile to another map tile. Embodiments may specify a level-of-detail for the adjacent map tile that is next in order to the level-of-detail specified for the feature in the other map tile. In this way, when applying texture data to connected features in adjacent map tiles embodiments may match level-of-detail textures across map tile boundaries.

Figure 1:
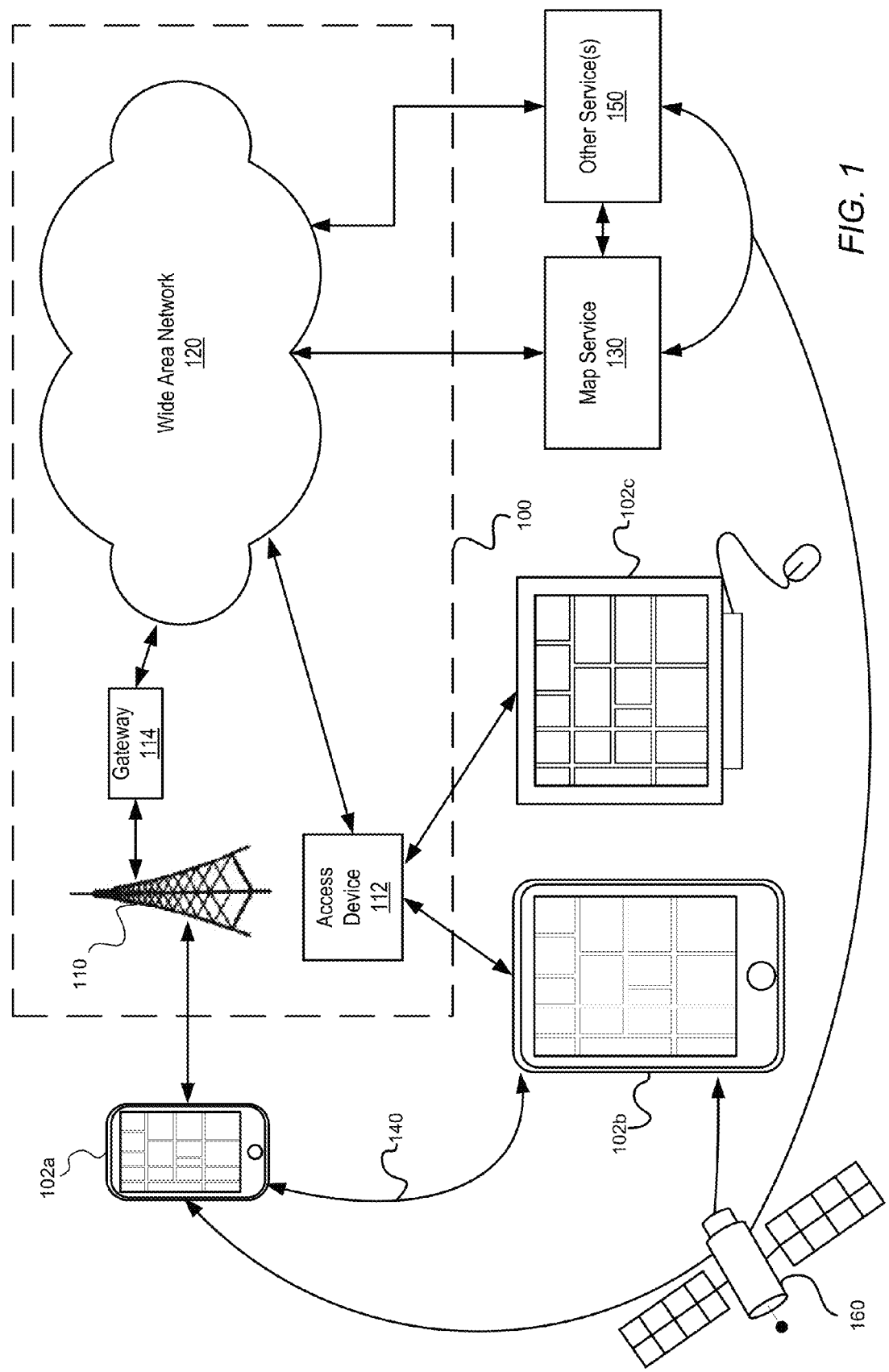
FIG. 1 illustrates an example of a map service operating environment according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Some portions of the detailed description which follow are presented in terms of algorithms or symbolic representation of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software and other programmable electronic devices. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels.

Various embodiments of methods, apparatus, and computer-readable storage media for rendering a map with adaptive textures for map features are described. Several embodiments of rendering a map are described that may be suitable for rendering portions of map data that may contain one or more features. Map features may be areas or objects within a map that describe or define a portion of the map. For example, a park, lake, or building may be map features as they define the geographic bounds of those objects in the map. For map features in a three dimensional map, map features may described one surface of an object, such as the side of a building, or an area, such as a park stretching to the horizon of the map view.

Embodiments may be an electronic or computing device, such as a mobile phone, personal digital assistant (PDA), tablet computer, laptop computer, system (e.g., FIG. 10), portable multi-function device (e.g., FIGS. 6-9), or any other device capable of rendering map data. In some embodiments, the computing device may be a client device, such as client device 102 described with regard to FIG. 1 below. In various embodiments, a client device may specify a level-of-detail texture for a given feature in map data. A level-of-detail texture may be one of a set of textures that are used to render a feature type. For example, a park feature in a map may have four level-of-detail textures. At the highest level-of-detail, the park texture may have various image data displaying trees, park equipment, and other landscaping. Each of the next three level-of-detail textures for the map may have decreasing amounts of detail. The lowest level-of-detail texture may be a solid green pattern. A client device may store many level-of-detail textures associated with many feature types. Level-of-detail textures associated with a feature type may be ordered according to the level-of-detail such that each level-of-detail texture is adjacent to the level-of-detail texture with a higher level-of-detail and a lower level-of-detail. A client device may also receive level-of-detail textures from other services, such as map service 130 described below with regard to FIG. 1, or be generated by a texture generation module or component based on information or texture data from these services, or from other applications or components operating on the client device. Level-of-detail textures may be used to render both two-dimensional and three-dimensional features in map data.

In various embodiments, a client device may specify a level-of-texture detail for a feature of a given feature type included in a portion of map data. In some embodiments, this specification is made by determining the location of the feature within the portion of map data within the map view. For example, the further away a feature is in the map view, the lower level-of-detail texture will be applied. In some embodiments, a client device may specify a level-of-detail according to the spatial information of the feature compared to level-of-detail textures. Spatial information may be the size of the feature compared to the texture.

Once specified, in some embodiments, a client device may provide the level-of-detail texture to a rendering unit, such as a GPU, to use when rendering the feature. The GPU may use the level-of-detail texture as the lowest level of a mipmap chain. Embodiments may also supply to the rendering unit a portion of a lower level-of-detail texture as the next lowest level of the mipmap chain. The portion of the lower level-of-detail texture may be a quarter of the texture, in some embodiments. As stated above, level-of-detail textures may be ordered according to level-of-detail for a given feature type. A client device may use the order of level-of-detail textures to determine the adjacent or next lowest level-of-detail texture. When a client device renders a feature, the client device may provide to the rendering unit a level-of-detail texture for a particular feature which is also the lowest level of the mipmap chain for the specified level-of-detail texture. In some embodiments, the next lowest level of the mipmap chain is the level-of-detail texture adjacent to the identified level-of-detail texture, and therefore lower in the ordering by level-of-detail.

In some embodiments, a rendering unit may blend between texture data from the lowest and next lowest levels in the mipmap chain based on spatial information for a portion of the feature being rendered. A rendering unit may switch to the next level-of-detail texture, and its corresponding mipmap chain, when the rendering unit would have otherwise applied texture data only from the next lowest level in the mipmap chain. In some embodiments, the rendering unit may switch to the next level-of-detail texture at tile boundaries or the boundaries of other portions of map data.

In some instances, a client device may generate the mipmap chain for a specified level-of-detail texture. A client device may select the specified level-of-detail texture as the lowest level in the mipmap chain. For the next lowest level of the mipmap chain, a client device may obtain a portion of the level-of-detail texture adjacent to the specified level-of-detail texture. A portion may be a quarter of the adjacent level-of-detail texture.

In some embodiments, the portion of map data may be a particular map tile, such as a map tile described below with regard to FIG. 1. A client device may consider another map tile adjacent to the particular map tile. If the adjacent map tile includes a feature also in the particular map tile, some embodiments may specify for the feature a level-of-detail texture adjacent to the level-detail texture specified for the map tile. In some embodiments, one part of the feature rendered for the particular map tile connects to another part of the feature rendered, such as for the adjacent tile. This part of the map feature is rendered from the next lowest level in the mipmap chain including the portion of the level-of-detail texture adjacent to the specified level-of-detail texture. The other part of the map feature is rendered from the level-of-detail texture adjacent to the specified level-of-detail texture. This may ensure that the rendered texture for the map feature matches across a boundary between the particular tile and the adjacent tile. Thus, a client device may smoothly blend map features across a boundary between one portion of map data, such as a map tile, to another portion of map data. Once the portion or portions of map data area rendered, a client device may display the rendered portion or portions of map data on a display device, such as an onboard display like touch-sensitive display 1012 described below in FIG. 8.

Embodiments of rendering a map with adaptive textures for map features may be implemented in any application that supports obtaining map data and rendering the map data. Example categories of applications in which embodiments may be implemented in are navigation devices, map display applications, and maps used in electronic games. More generally, embodiments may be implemented in applications that allow generated texture mipmap chains to be rendered onto areas of obtained images. Some embodiments may be implemented in a map service operating environment, such as described below with regard to FIG. 1. Specific examples of applications or technologies in which embodiments may be implemented include, but are not limited to, map or navigation software applications on an iPod Touch®, iPhone®, or iPad® devices from Apple Inc. of Cupertino, Calif.

Figure 5:
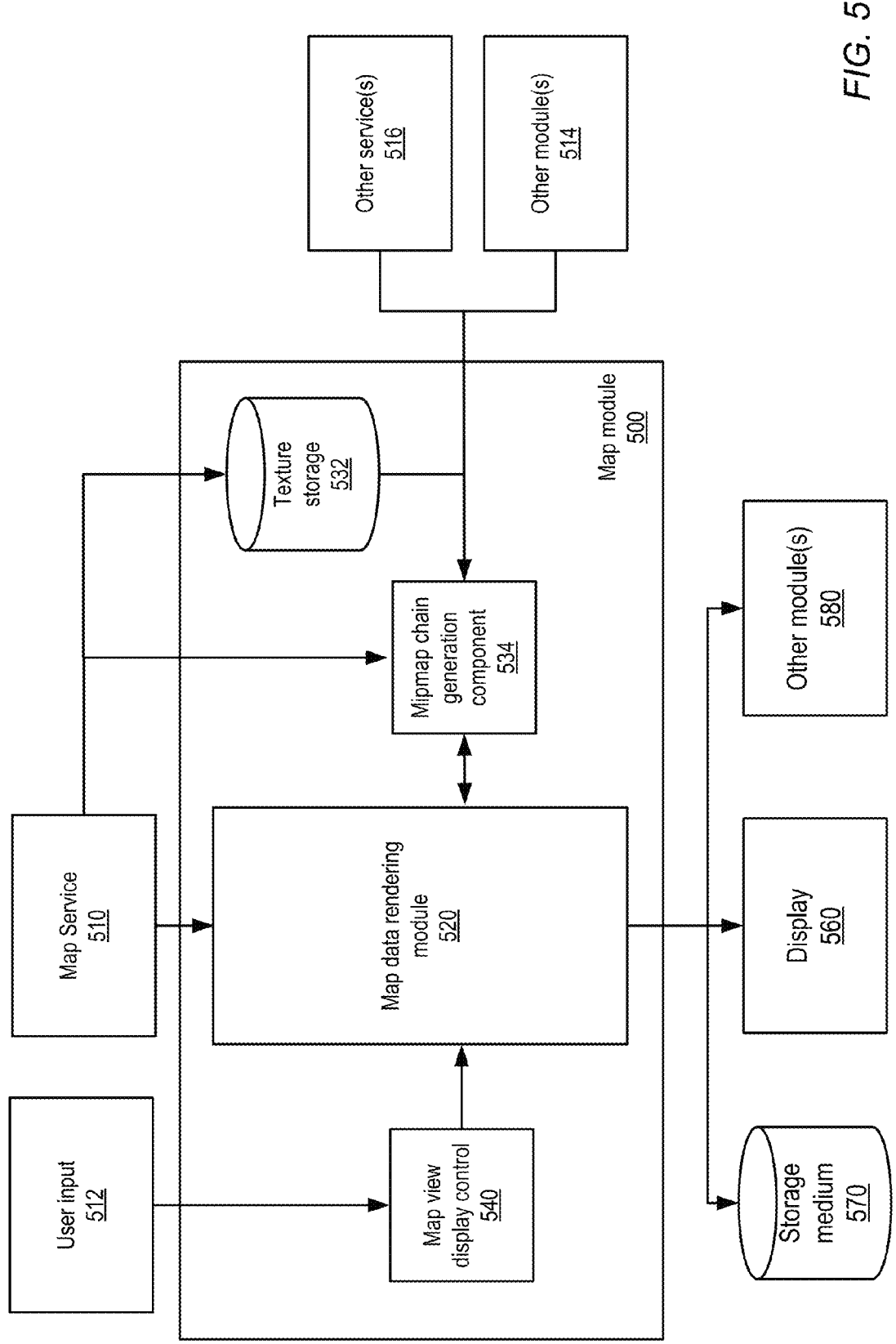
FIG. 5 illustrates a map module that renders a map with adaptive textures for map features according to some embodiments.

Embodiments of rendering a map with adaptive textures for map features may be implemented and performed by a module or modules implemented by program instructions stored in a non-transitory computer-readable storage medium and executable by one or more processors, such as one or more CPUs or GPUs. An example module that may implement some embodiments, and an example application that may implement the module, as described herein, is illustrated in FIG. 5. An example electronic device on which embodiments may be implemented is illustrated in FIGS. 6 through 9. An example system on which embodiments may be implemented is illustrated in FIG. 10.

Map Service Operating Environment

Various embodiments may operate within a map service operating environment. FIG. 1 illustrates a map service operating environment, according to some embodiments. A map service 130 may provide map services for one or more client devices 102a-102c in communication with the map service 130 through various communication methods and protocols. A map service 130 generally may provide map information and other map-related data, such as two-dimensional map image data (e.g., aerial view of roads utilizing satellite imagery), three-dimensional map image data (e.g., traversable map with three-dimensional features, such as buildings), route and direction calculation (e.g., ferry route calculations or directions between two points for a pedestrian), real-time navigation data (e.g., turn-by-turn visual navigation data in two or three dimensions), location data (e.g., where is the client device currently located), and other geographic data (e.g., wireless network coverage, weather, traffic information, or nearby points-of-interest). In various embodiments, the map service data may include localized labels for different countries or regions; localized labels may be utilized to present map labels (e.g., street names, city names, points of interest) in different languages on client devices. Client devices 102a-102c may utilize these map services by obtaining map service data. Client devices 102a-102c may implement various techniques to process map service data. Client devices 102a-102c may then provide map services to various entities, including, but not limited to, users, internal software or hardware modules, and/or other systems or devices external to the client devices 102a-102c.

In some embodiments, a map service may be implemented by one or more nodes in a distributed computing system. Each node may be assigned one or more services or components of a map service. Some nodes may be assigned the same map service or component of a map service. A load balancing node may distribute access or requests to other nodes within a map service. In some embodiments a map service may be implemented as a single system, such as a single server. Different modules or hardware devices within a server may implement one or more of the various services provided by a map service.

A map service may provide map services by generating map service data in various formats. In some embodiments, one format of map service data may be map image data. Map image data may provide image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map may produce the original map. Tiles may be generated from map image data, routing or navigation data, or any other map service data. In some embodiments map tiles may be raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles may be vector-based map tiles, encoded using vector graphics, including, but not limited to, Scalable Vector Graphics (.svg) or a Drawing File (.drw). Embodiments may also include tiles with a combination of vector and raster data. Metadata or other information pertaining to the map tile may also be included within or along with a map tile, providing further map service data to a client device. In various embodiments, a map tile may be encoded for transport utilizing various standards and/or protocols, some of which are described in examples below.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service may perform various techniques to analyze a map tile before encoding the tile for transport. This analysis may optimize map service performance for both client devices and a map service. In some embodiments map tiles may be analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile may contain certain mask values, which are associate with one or more textures. Embodiments may also analyze map tiles for specified features that may be associated with certain map styles that contain style identifiers.

Other map services may generate map service data relying upon various data formats separate from a map tile. For example, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wire or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service may respond to client device requests for map services. These requests may be a request for a specific map or portion of a map. Embodiments may format requests for a map as requests for certain map tiles. In some embodiments, requests may also supply the map service with starting locations (or current locations) and destination locations for a route calculation. A client device may also request map service rendering information, such as map textures or stylesheets. In at least some embodiments, requests may also be one of a series of requests implementing turn-by-turn navigation. Requests for other geographic data may include, but are not limited to, current location, wireless network coverage, weather, traffic information, or nearby points-of-interest.

A map service may, in some embodiments, may analyze client device requests to optimize a device or map service operation. For example, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and as such the above examples are not intended to be limiting.

Various embodiments of client devices (e.g., client devices 102a-102c) may be implemented on different device types. Examples of a portable-multifunction device include the devices illustrated in FIGS. 6 through 10, such as multifunction device 1200 and multifunction device 1400. Client devices 102a-102c may utilize map service 130 through various communication methods and protocols described below. In some embodiments, client devices 102a-102c may obtain map service data from map service 130. Client devices 102a-102c may request or receive map service data. Client devices 102a-102c may then process map service data (e.g., render and/or display the data) and may send the data to another software or hardware module on the device or to an external device or system.

A client device may, according to some embodiments, implement techniques to render and/or display maps. These maps may be requested or received in various formats, such as map tiles described above. A client device may render a map in two-dimensional or three-dimensional views. Some embodiments of a client device may display a rendered map and allow a user, system, or device providing input to manipulate a virtual camera in the map, changing the map display according to the virtual camera's position, orientation, and field-of-view. Various forms and input devices may be implemented to manipulate a virtual camera. In some embodiments, touch input, through certain single or combination gestures (e.g., touch-and-hold or a swipe) may manipulate the virtual camera. Other embodiments may allow manipulation of the device's physical location to manipulate a virtual camera. For example, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

A client device may, in some embodiments, provide various visual feedback to virtual camera manipulations, such as displaying an animation of possible virtual camera manipulations when transitioning from two-dimensional map views to three-dimensional map views. A client device may also allow input to select a map feature or object (e.g., a building) and highlight the object, producing a blur effect that maintains the virtual camera's perception of three-dimensional space.

In some embodiments, a client device may implement a navigation system (e.g., turn-by-turn navigation). A navigation system provides directions or route information, which may be displayed to a user. Embodiments of a client device may request directions or a route calculation from a map service. A client device may receive map image data and route data from a map service. In some embodiments, a client device may implement a turn-by-turn navigation system, which provides real-time route and direction information based upon location information and route information received from a map service and/or other location system, such as Global Positioning Satellite (GPS). A client device may display map image data that reflects the current location of the client device and update the map image data in real-time. A navigation system may provide auditory or visual directions to follow a certain route.

A virtual camera may be implemented to manipulate navigation map data according to some embodiments. Some embodiments of client devices may allow the device to adjust the virtual camera display orientation to bias toward the route destination. Embodiments may also allow virtual camera to navigation turns simulating the inertial motion of the virtual camera.

Client devices may implement various techniques to utilize map service data from map service. A client device may implement some techniques to optimize rendering of two-dimensional and three-dimensional map image data. In some embodiments, a client device may locally store rendering information. For example, a client may store a stylesheet which provides rendering directions for image data containing style identifiers. In another example, common image textures may be stored to decrease the amount of map image data transferred from a map service. Client devices may also implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. Some embodiments of client devices may also order or prioritize map service data in certain techniques. For example, a client device may detect the motion or velocity of a virtual camera, which if exceeding certain threshold values, lower-detail image data will be loaded and rendered of certain areas. Other examples include: rendering vector-based curves as a series of points, preloading map image data for areas of poor communication with a map service, adapting textures based on display zoom level, or rendering map image data according to complexity.

In some embodiments, client devices may communicate utilizing various data formats separate from a map tile. For example, some client devices may implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. A client device may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 1 illustrates one possible embodiment of an operating environment 100 for a map service 130 and client devices 102a-102c. In some embodiments, devices 102a, 102b, and 102c can communicate over one or more wire or wireless networks 110. For example, wireless network 110, such as a cellular network, can communicate with a wide area network (WAN) 120, such as the Internet, by use of gateway 114. A gateway 114 may provide a packet oriented mobile data service, such as General Packet Radio Service (GPRS), or other mobile data service allowing wireless networks to transmit data to other networks, such as wide area network 120. Likewise, access device 112 (e.g., IEEE 802.11g wireless access device) can provide communication access to WAN 120. Devices 102a and 102b can be any portable electronic or computing device capable of communicating with a map service, such as a portable multifunction device described below with respect to FIGS. 7 to 10. Device 402c can be any non-portable electronic or computing device capable of communicating with a map service, such as a system described below in FIG. 10.

In some embodiments, both voice and data communications can be established over wireless network 110 and access device 112. For example, device 102a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 110, gateway 114, and WAN 120 (e.g., using Transmission Control Protocol/Internet Protocol (TCP/IP) or User Datagram Protocol (UDP)). Likewise, in some implementations, devices 102b and 102c can place and receive phone calls, send and receive e-mail messages, and retrieve electronic documents over access device 112 and WAN 120. In various embodiments, any of the illustrated client device may communicate with map service 130 and/or other service(s) 150 using a persistent connection established in accordance with one or more security protocols, such as the Secure Sockets Layer (SSL) protocol or the Transport Layer Security (TLS) protocol.

Devices 102a and 102b can also establish communications by other means. For example, wireless device 102a can communicate with other wireless devices (e.g., other devices 102a or 102b, cell phones) over the wireless network 110. Likewise devices 102a and 102b can establish peer-to-peer communications 140 (e.g., a personal area network) by use of one or more communication subsystems, such as Bluetooth® communication from Bluetooth Special Interest Group, Inc. of Kirkland, Wash. 102c can also establish peer to peer communications with devices 102a or 102b. (not pictured). Other communication protocols and topologies can also be implemented. Devices 102a and 102b may also receive Global Positioning Satellite (GPS) signals from GPS 140.

Devices 102a, 102b, and 102c can communicate with map service 130 over the one or more wire and/or wireless networks, 110 or 112. For example, map service 130 can provide a map service data to rendering devices 102a, 102b, and 102c. Map service 130 may also communicate with other services 150 to obtain data to implement map services. Map service 130 and other services 150 may also receive GPS signals from GPS 140.

In various embodiments, map service 130 and/or other service(s) 150 may be configured to process search requests from any of client devices. Search requests may include but are not limited to queries for business, address, residential locations, points of interest, or some combination thereof. Map service 130 and/or other service(s) 150 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria include but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 130 and/or other service(s) 150 may be configured to provide auto-complete search results that may be displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the internet) by map service 130 and/or other service(s) 150, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device may be configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 130 and/or other service(s) 150 may provide one or more feedback mechanisms to receive feedback from client devices 102*a-c*. For instance, client devices may provide feedback on search results to map service 130 and/or other service(s) 150 (e.g., feedback specifying ratings, reviews, temporary or permanent business closures, errors etc.); this feedback may be used to update information about points of interest in order to provide more accurate or more up-to-date search results in the future. In some embodiments, map service 130 and/or other service(s) 150 may provide testing information to the client device (e.g., an AB test) to determine which search results are best. For instance, at random intervals, the client device may receive and present two search results to a user and allow the user to indicate the best result. The client device may report the test results to map service 130 and/or other service(s) 150 to improve future search results based on the chosen testing technique, such as an A/B test technique in which a baseline control sample is compared to a variety of single-variable test samples in order to improve results.

Workflow for Rendering a Map with Adaptive Textures

Figure 2:
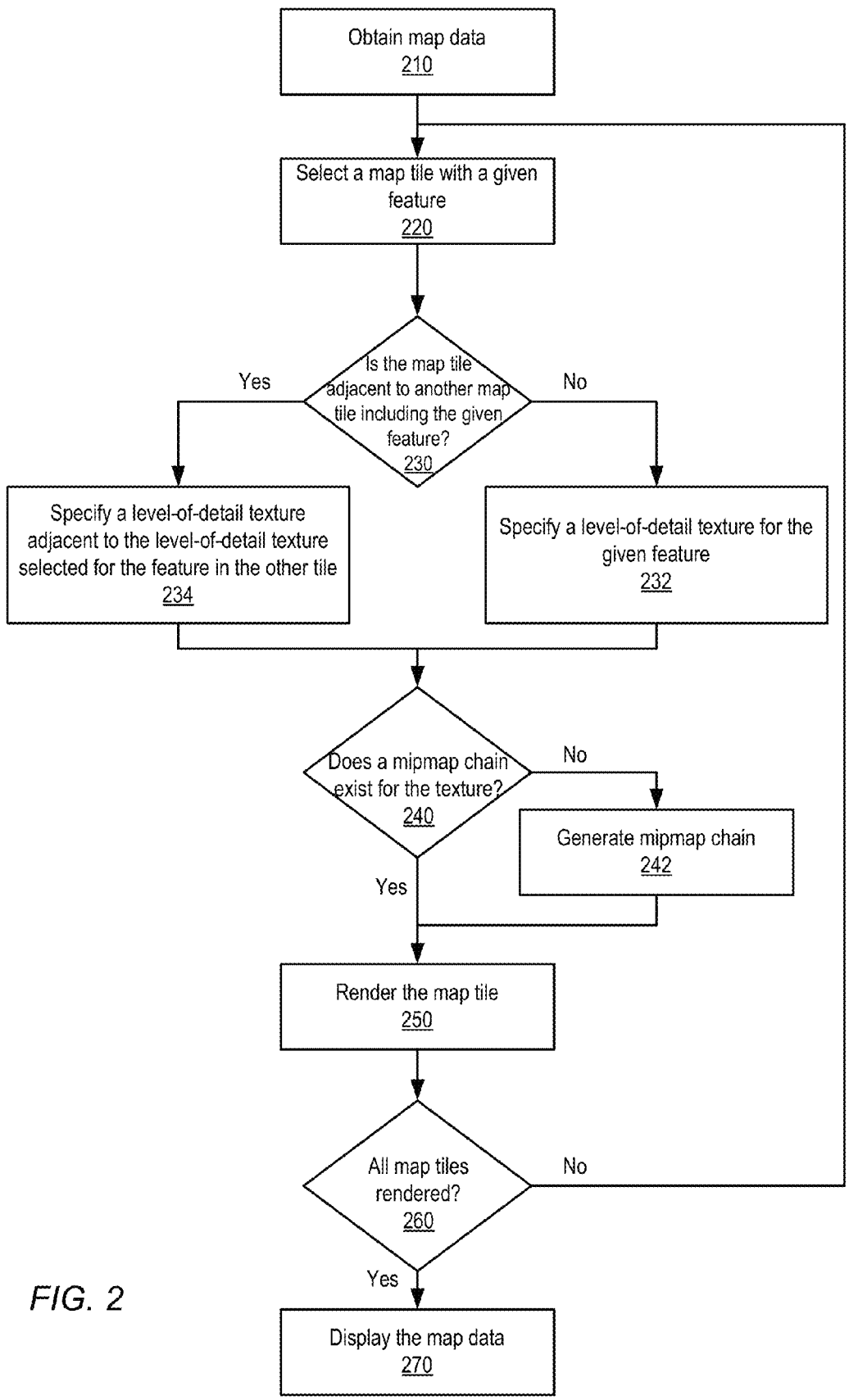
FIG. 2 illustrates a flowchart of a method for rendering a map with adaptive textures for map features according to some embodiments.

Various embodiments may obtain map data from a server, such as map service 130 described above with regard to FIG. 1, with portions of the map data containing features. Once obtained, embodiments may render the map data for display on a display device. To render a portion of map data with a given feature, embodiments may specify a level-of-detail texture for the feature and render the map data by providing a level-of-detail texture and mipmap chain for the feature. In some embodiments, the mipmap chain may be generated. The level-of-detail textures and corresponding mipmap chains provide adaptive textures for the features in map data. FIG. 2 illustrates a flowchart of a method for rendering a map with adaptive textures for map features.

In some embodiments, a client device, such as a mobile phone, laptop computer, tablet computer, personal digital assistant (PDA), navigation device, portable multi-function device (described below at FIGS. 6-9), or a client device 102 (described above with regard to FIG. 1), may obtain map data 210 from a server, such as map service 130 in FIG. 1. Map data may be map information and other map-related data, such as two-dimensional map image data (e.g., aerial view of roads utilizing satellite imagery), three-dimensional map image data (e.g., traversable map with three-dimensional features, such as buildings), route and direction calculation (e.g., ferry route calculations or directions between two points for a pedestrian), real-time navigation data (e.g., turn-by-turn visual navigation data in two or three dimensions), location data (e.g., where is the client device currently located), and other geographic data (e.g., wireless network coverage, weather, traffic information, or nearby points-of-interest). In various embodiments, the map service data may include localized labels for different countries or regions; localized labels may be utilized to present map labels (e.g., street names, city names, points of interest) in different languages on client devices.

In various embodiments, a portion of the map data may include a feature. As discussed above map features may be areas or objects within a map that describe or define a portion of the map. For example, a park, lake, or building may be map features as they define the geographic bounds of those objects in the map. In some embodiments vector graphics data is used to describe the feature shapes in obtained map data. Various methods and formats for encoding vector graphics data are well-known to those of ordinary skill in the art. For example, feature shapes may be encoded using Scalable Vector Graphics (.svg) or a Drawing File (.drw). In some embodiments, map data may also contain raster graphics data.

A client device may, in some embodiments, select a map tile 220 or other portion of the map data including a feature of a given feature type. In some embodiments the map data may include one or more map tiles, such as the map tiles described above with regard to FIG. 1. A client device may implement various methods to determine the order of tile selection from map data. The various methods may be determined by the particular view of the map the obtained map data describes. For example, if the map data contains map tiles that describe an aerial view of the map, the order of selection for map tiles may be random. However, in another example, the map tiles may describe a three-dimensional map view with a horizon. Map tiles in such a view may be selected according to their visual depth as viewed by an observer, so that the tiles closest to the observer may be select before tiles further away.

Figure 4:
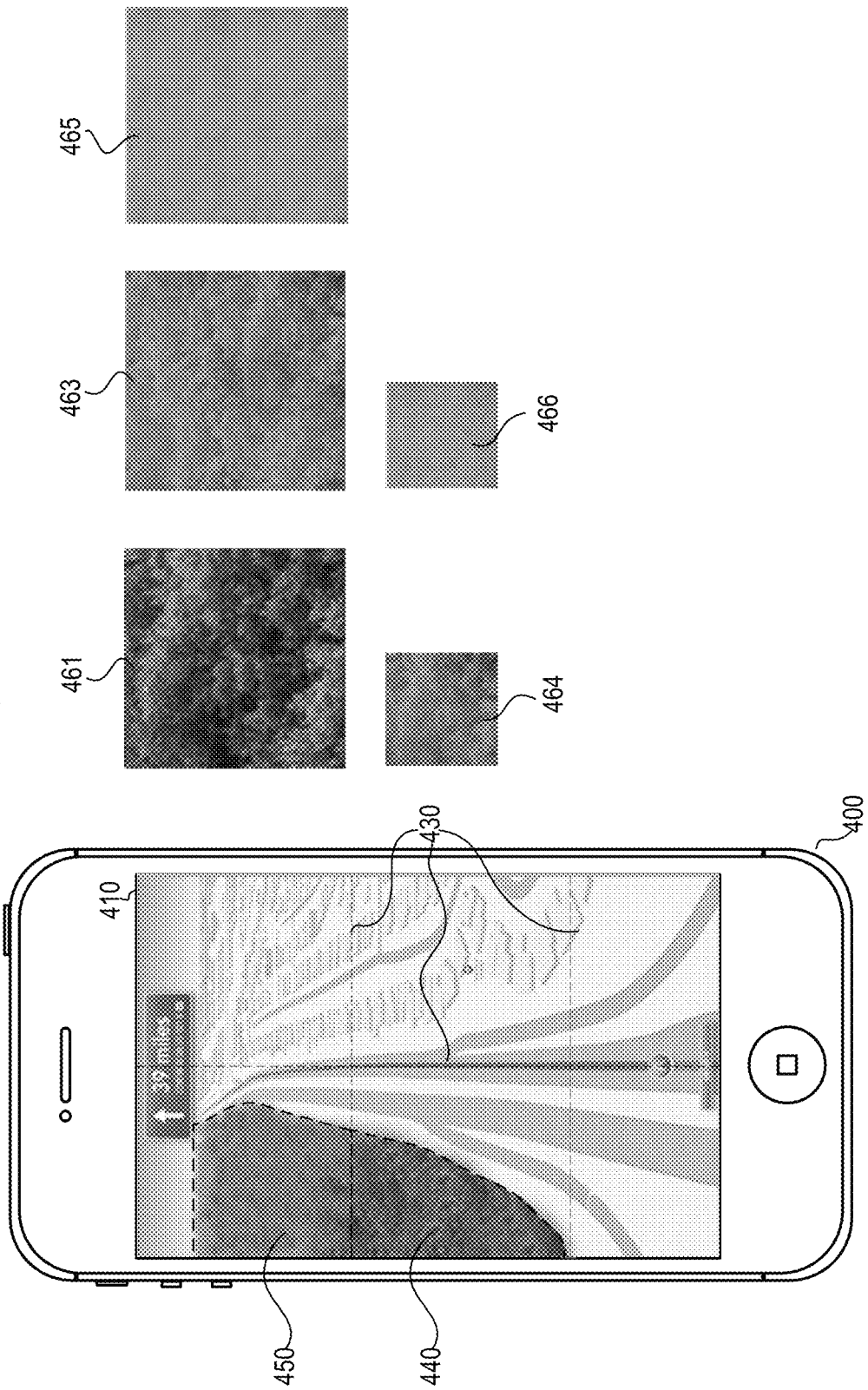
FIG. 4 illustrates an example of blending between level-of-detail textures for a feature that connects from one map tile to another adjacent map tile according to some embodiments.

Map tiles may be adjacent to one another and include features that are in more than one adjacent map tile. For example, FIG. 4 illustrates a park feature that is contained in two adjacent tiles, as indicated at 440 and 450, displayed on a portable multi-function device 400. Therefore, in some embodiments, a client device may determine if a selected map tile is adjacent to another map tile with a given feature in the selected map tile that was also included in a prior adjacent map tile 230. However, some embodiments may not make this determination.

Figure 3:
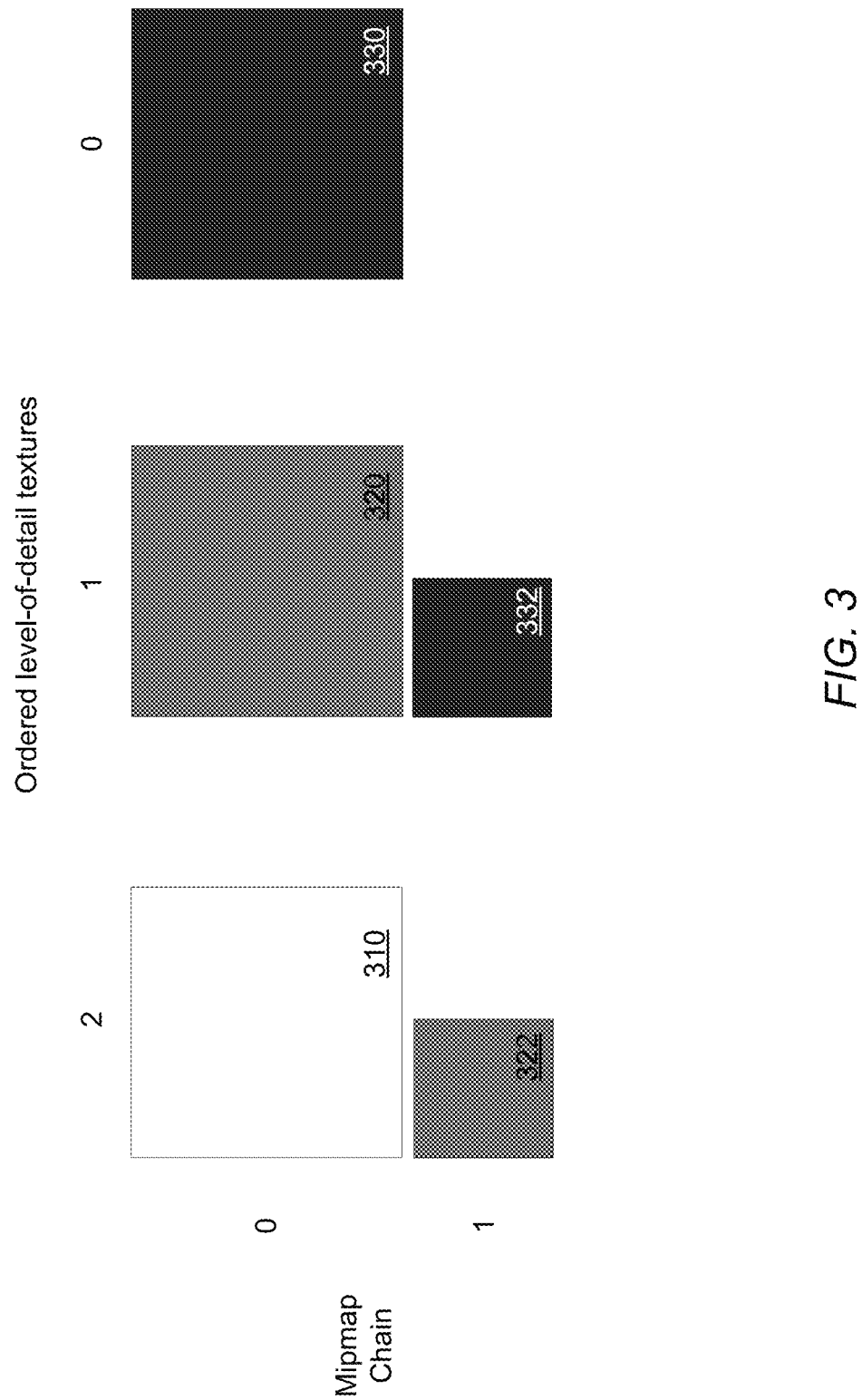
FIG. 3 illustrates an example of ordered level-of-detail textures and associated mipmap chains according to some embodiments.

A client device may, in various embodiments, specify a level-of-detail texture 232 for the included feature of the selected map tile from among a plurality of level-of-detail textures for the given feature type. As discussed above, a level-of-detail texture may be one of a set of textures that are used to render a feature type. For example, a park feature in a map may have four level-of-detail textures. At the highest level-of-detail, the park texture may have various image data displaying trees, park equipment, and other landscaping. Each of the next three level-of-detail textures for the map may have decreasing amounts of detail. The lowest level-of-detail texture may be a solid green pattern. A client device may store at a client device many level-of-detail textures associated with many feature types. Level-of-detail textures associated with a feature type may be ordered according to the level-of-detail such that each level-of-detail texture is adjacent to the level-of-detail texture with a higher level-of-detail and a lower level-of-detail. FIG. 3 illustrates an example of three level-of-detail textures ordered according to level-of-detail, level-of-detail texture 310, level-of-detail texture 320, and level-of-detail texture 330. A client device may also receive level-of-detail textures from other services, such as map service 130 described below with regard to FIG. 1, or be generated by a texture generation module or component, such as mipmap chain generation component 534 described below with regard to FIG. 5, based on information or texture data from these services, or from other applications or components operating on the client device. Level-of-detail textures may be used to render both two-dimensional and three-dimensional features in map data. In addition, level-of-detail textures may be the same size, such as the same pixel dimensions.

To specify a level-of-detail texture for the included feature from among the plurality of features for a given feature type, a client device may employ a variety of methods. For some embodiments, a client device may receive along with the map data a given level-of-detail for portions of the map data or map tiles. For example, each map tile may contain metadata indicating a particular level-of-detail for the tile. In a similar example, a level-of-detail may be tied to a particular zoom level indicated in a map tile, or as indicated by a map application obtaining the map data including the map tile.

Other embodiments of a client device may perform a depth testing method on the one or more map tiles or portions of map data, to determine the relative depth of the map tile in the view of the map described by the map data in order to specify a level-of-detail texture for the feature in the portion of the map data. For example, in FIG. 4 the map tiles, indicated by the dotted lines 430, display a three-dimensional view of a map from an oblique aerial viewpoint. The bottom two tiles appear closer to the viewpoint, than the middle two tiles, and the middle two tiles appear closer to the viewpoint than the upper two tiles, which appear to display the map into a horizon. Each of these map tiles may be assigned levels-of-detail based upon their depth in the view of the map, with the bottom tiles having higher levels-of-detail than the middle tiles, and the middle tiles having higher levels-of-detail than the upper tiles.

In some embodiments of a client device, specifying a level-of-detail texture for the feature may be determined based on spatial information of the feature. For instance, some embodiments may project the feature onto a space representing the display space of the view of the map described by the map data, such as touch-sensitive display 410 in FIG. 4. A client device may look at the area of feature in the display space, such as the area of the feature indicated at 440 and 450, and calculate a ratio of the feature to total display space. Ratio values for features may be assigned to varying levels-of-detail by various indices or other functions in a client device.

If, as in some embodiments, the selected map tile is adjacent to a map tile including the feature, a client device may specify a level-of-detail texture adjacent to the specified level-of-detail texture for the other map tile 234 in the order of the level-of-detail textures. FIG. 3 illustrates an order of level-of-detail textures. For example, if the other map tile was specified level-of-detail texture 310, the specified level-of-detail texture for the adjacent selected map tile would be texture 320. Likewise, if the other map tile was specified level-of-detail texture 320, the specified level-of-detail texture for the adjacent selected map tile would be texture 330.

Various embodiments of a client device may store or have access to mipmap chains associated with the plurality of level-of-detail textures for a given feature type. These mipmap chains may have been obtained upon loading or updating new software or hardware components on a client device. These stored mipmap chains may have been generated previously according to the method described below and stored for future use on the client device. In some embodiments, however, a client device may determine if a mipmap chain for the specified level-of-detail texture for the feature exists 240. If not, a client device may generate the mipmap chain 242 for the specified level-of-detail texture. Mipmap chains are generally a set of texture images at varying levels-of-detail used by a rendering device, such as a GPU or CPU, to apply texture data to objects in an image being rendered according to the varied levels-of-detail needed in the image using the texture. In some embodiments, a client device may select the specified level-of-detail texture as the lowest level in the mipmap chain. Then, the client device may crop the adjacent level-of-detail texture in the ordered level-of-detail textures to obtain a portion for the next lowest level in the mipmap chain.

FIG. 3 illustrates provides an illustration of mipmap chains generated using ordered level-of-detail textures. Level-of-detail textures, 310, 320, and 330 are ordered according to level-of-detail, with texture 310 at the highest level-of-detail, 2, texture 320 at the next highest level-of-detail, 1, and texture 330 at the lowest of level-of-detail 0. To generate mipmap chain for level-of-detail texture 310, a client device may select level-of-texture detail 310 at the lowest level in the mipmap chain, level 0. For the next lowest level in the mipmap chain, level 1, the client device may crop a portion of the adjacent texture in order, level-of-detail texture 320, to obtain the cropped portion 322 for the next lowest level.

If, as discussed above, a feature is included in more than one adjacent map tile or portion of map data, a client device may specify the level-of-detail texture as the adjacent level-of-detail texture for the portion of the feature included in the adjacent map tile. For example, level-of-detail texture 320 is adjacent to level-of-detail texture 310. If level-of-detail texture 320 is specified for an adjacent map tile, then a generated mipmap chain for level-of-texture 320 will select texture 320 as the lowest level in the mipmap chain and crop a portion of the adjacent level-of-detail texture 330 to a portion 332 for the next lowest level of the mipmap chain.

In some embodiments the cropped portion of the adjacent level-of-detail texture may be a quarter of the texture. The cropped portion may be obtained from any space within the level-of-detail texture, whether it be an upper or lower quadrant or an area cropped from the middle of the level-of-detail texture. Mipmap chains, in some embodiments, may contain levels where each higher level is one quarter of the size of the previous level. As discussed above, in some embodiments the level-of-detail textures may be the same size, and therefore cropping one quarter of another texture may obtain a correctly sized portion of a texture for a higher level in a mipmap chain. Other embodiments, however, may implement other forms of mipmap chains, and therefore, the portion of the adjacent mipmap chain is not intended to be limited to a quarter of the texture.

To render the map tile 250, or portion of the map data, in some embodiments a client device may provide to a rendering unit the specified level-of-detail texture, as specified at 232 or 234, with an associated mipmap chain, as obtained from storage or generated at 242. A generated or stored mipmap chain may be identical in content for an associated level-of-detail texture. A rendering unit or component may be a hardware or software device or component implemented in a variety of combinations. Some rendering units may use common implementations of devices or components well-known to those of ordinary skill in the art, which are platform independent, such as, but not limited to, utilizing the Open Graphics Library (OpenGL) or Direct3D application programmer interfaces, or variants thereof such as OpenGL ES along with various graphics cards, GPUs, and/or CPUs. Customized rendering units may also be implemented, some of which may optimize the performance of various software or hardware components, such as CPUs or GPUs.

A rendering unit may apply various mipmap techniques using the provided level-of-detail texture and associated mipmap chain. As a rendering unit is applying a texture to a feature in the portion of map data or map tile, the rendering unit may blend based on spatial information for the portion of the feature being rendered texture data from the lowest and next lowest levels in the mipmap chain. Spatial information for the portion of the feature being rendered may be a ratio between the size of the feature as would be displayed and the size of the texture in each level of the mipmap chain. For example, if the portion of a feature is compared to level 0 in a mipmap chain, and the size ratio works out to be 2 to 1, 2 features to 1 texture, then a rendering unit may blend 50 percent of the texture data from the texture of level 0 in the mipmap chain and 50 percent of the data from the texture of level 1 in the mipmap chain. As the portion of the feature size decreases and approaches the size of the level 1 texture in the mipmap chain, more or the level 1 texture data will be applied to the portion of the feature. In some embodiments, when the spatial information indicates that only the level 1 texture data should be applied, a client device may provide the rendering unit with another level-of-detail texture and associated mipmap chain for the feature being rendered.

Various other embodiments for blending and/or choosing levels of a mipmap chain are available, such as nearest-neighbor which chooses the level-of-detail most closely corresponding to the area where the texture is to be applied. Some methods may choose the two nearest levels-of-detail, such as using trilinear filtering. Once one or more levels-of-detail are chosen, rendering devices may apply various filtering methods to copy image data from the textures and apply the image data to an area. For example, bilinear filtering may select the four nearest textels (pixels of the texture) to a target pixel (the pixel to be copied to) and calculated a weighted average of the color value for the textels. Mipmap techniques may apply the texture data from several levels-of-detail in an area of an image to decrease the resolution of the image detail as the texture moves further away from the observer. Embodiments may use one of the mipmap techniques discussed above or any other mipmap technique to apply the corresponding texture mipmap chain to feature shapes in the map data.

In some embodiments, a part of a feature rendered for a particular map tile may connect to another part of the feature rendered for an adjacent map tile. A rendering unit of a client device may blend, according to the various techniques discussed above, texture data for part of the feature from the next lowest level in the mipmap chain including the portion of the other one of the plurality of level-of-detail textures. The other part of the feature may be rendered from the other one of the plurality of level-of-detail textures such that the rendered texture for the feature matches across a boundary between the particular map tile and the adjacent map tile. FIG. 4 illustrates an example of a feature that connects from one map tile to another adjacent map tile.

A portable multi-function display device 400 map tiles, as indicated by the dotted lines of 430, on a touch-sensitive display 410. In touch-sensitive display 410, park feature 440 and 450 are connected in adjacent map tiles. When device 400 selects to render feature 440 it specifies level-of-detail texture 461 which is one of plurality of level-of-detail textures for the park feature, as shown in order at 461, 463, and 465. Device 400 provides a rendering unit the specified level-of-detail texture 461 along with the mipmap chain, which is contains level-of-detail texture 461 as the lowest level of the mipmap chain and a portion of the adjacent level-of-detail texture 463 as the next lowest level of the mipmap chain 464. As the rendering unit blends the texture data from the mipmap chain, it applies texture data from the next lowest level of the mipmap chain 464 to feature 440. When selecting the map tile including the connected part of the park feature 450, a device may specify a level-of-detail texture 463, which is adjacent to the level-of-detail texture specified in the adjacent map tile including the feature 440. A client device may provide the specified level-of-detail texture 463 along with a mipmap chain, which includes a portion of the level-of-detail texture 465 as the next lowest level of the mipmap chain 466. As the rendering unit begins to blend texture data from the mipmap chain for the connected park feature 450, the rendering unit applies texture data from the lowest level of the mipmap chain, level-of-detail texture 463 matching the texture data applied from the next lowest level of the chain 464 in the connected portion of the park feature in the adjacent tile 440. Embodiments of a client device implementing such a method may provide a smooth blending between a connecting feature over a boundary between two portions of map data, such as a map tile.

In some embodiments, portions of map data, such as map tiles may contain raster graphics data. Rendering map data containing raster data may be implemented by decoding or decompressing, raster data according to its format and, if displaying the raster data, submitting the raster data to a hardware device, such as a frame buffer, which displays the raster data. Many other software and hardware implementations may be used to render the areas containing raster data.

Figure 8:
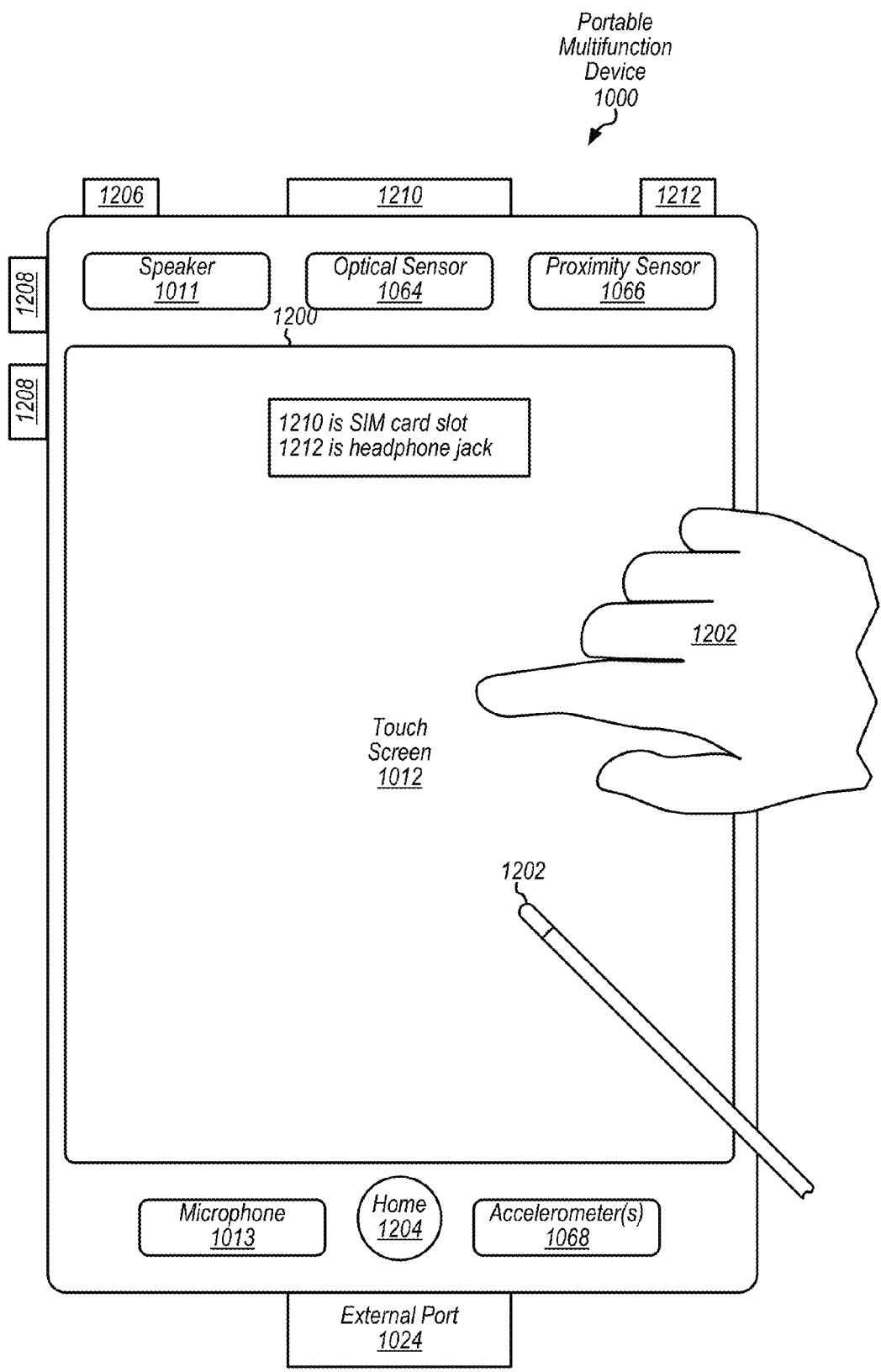
FIG. 8 illustrates an example electronic device according to some embodiments.

If all of the portions of the map tiles of the map data have been rendered 260, some embodiments of a client device may display the rendered map data 270 on a display device, such as touch-sensitive display 1012 in FIG. 8. A client device may also store the rendered map data or send the map data to other modules or applications for further processing. In some embodiments, not all of the obtained map data need be rendered to display the rendered portion of map data. In some embodiments if all map tiles or portions of map data have not been rendered 260, a client device may select another portion of map data, such as a map tile.

Example Embodiments

Various embodiments may implement a method of rendering a map with adaptive textures for map features. A map application or module may, in some embodiments, be implemented by a non-transitory, computer-readable storage medium and one or more processors (e.g., CPUs and/or GPUs) of a computing apparatus. The computer-readable storage medium may store program instructions executable by the one or more processors to cause the computing apparatus to implement: for a portion of map data including a feature of a given feature type: specifying, for the feature, a level-of-detail texture from among a plurality of level-of-detail textures for the given feature type, and wherein said plurality of level-of-detail textures has an order according to level-of-detail; and rendering the portion of map data, wherein said rendering comprises: providing, to a rendering unit, the specified level-of-detail texture with a mipmap chain for the specified level-of-detail texture; wherein the mipmap chain for the specified level-of-detail texture comprises a portion of another one of the plurality of level-of-detail textures adjacent to the specified level-of-detail texture in said order, as described herein. Other embodiments of the module may be at least partially implemented by hardware circuitry and/or firmware stored, for example, in a non-volatile memory.

FIG. 5 illustrates a map module that implements rendering a map with adaptive textures for map features as described in FIGS. 2 through 4. FIG. 5 is only an example of a module and is not intended to be limiting as to this example or other possible embodiments. A map module 500 may be implemented on an electronic device, such portable multi-function device 1000 described below with respect to FIGS. 6 through 9, or a system, such as described below with respect to FIG. 10. Map module 500 may obtain map data from a map service 510, such as map service 130 in FIG. 1. Map data rendering module 520 may for a portion of map data, such as a map tile, specify a level-of-detail texture for a feature included in the portion of map data and render the portion of map data including the feature according to the various methods described above with respect to FIGS. 2 through 4. In some embodiments, a mipmap chain generation component 534 may provide access to previously generated mipmap chains for level-of-detail textures or generate mipmap chains for specified level-of-detail textures.

The mipmap chain generation component 534 may obtain texture data to generate a texture mipmap chain from several texture sources. Texture storage 534 may store previously obtained textures, from sources such as map service 510. Texture storage 534 may also obtain textures previously generated by mipmap chain generation component 534. Other services 516 may supply texture data to mipmap chain generation component 534. For example, a weather service may supply several weather textures or weather information to be incorporated into a texture mipmap chain. Other modules 514 on a client device, such as client device 102 in FIG. 1, may supply texture data to a mipmap chain generation component 534. For example, a skiing module may supply textures to be layered over certain areas to display various ski conditions. Mipmap chain generation component 534 may contain various subcomponents, such as texture generating functions or components or communication components.

User input 512 may be obtained through a user input device, such as touch input via touch-sensitive display 1012 in FIG. 8, to modify the displayed map view through a map view display control 540. In some embodiments, user input modifies the zoom level of the displayed map view. In response, map data rendering module 520 may specify a level-of-detail texture according to or in response to the modified zoom level and then render the portion of map data with the level-of-detail texture and associated mipmap chain.

Figure 9:
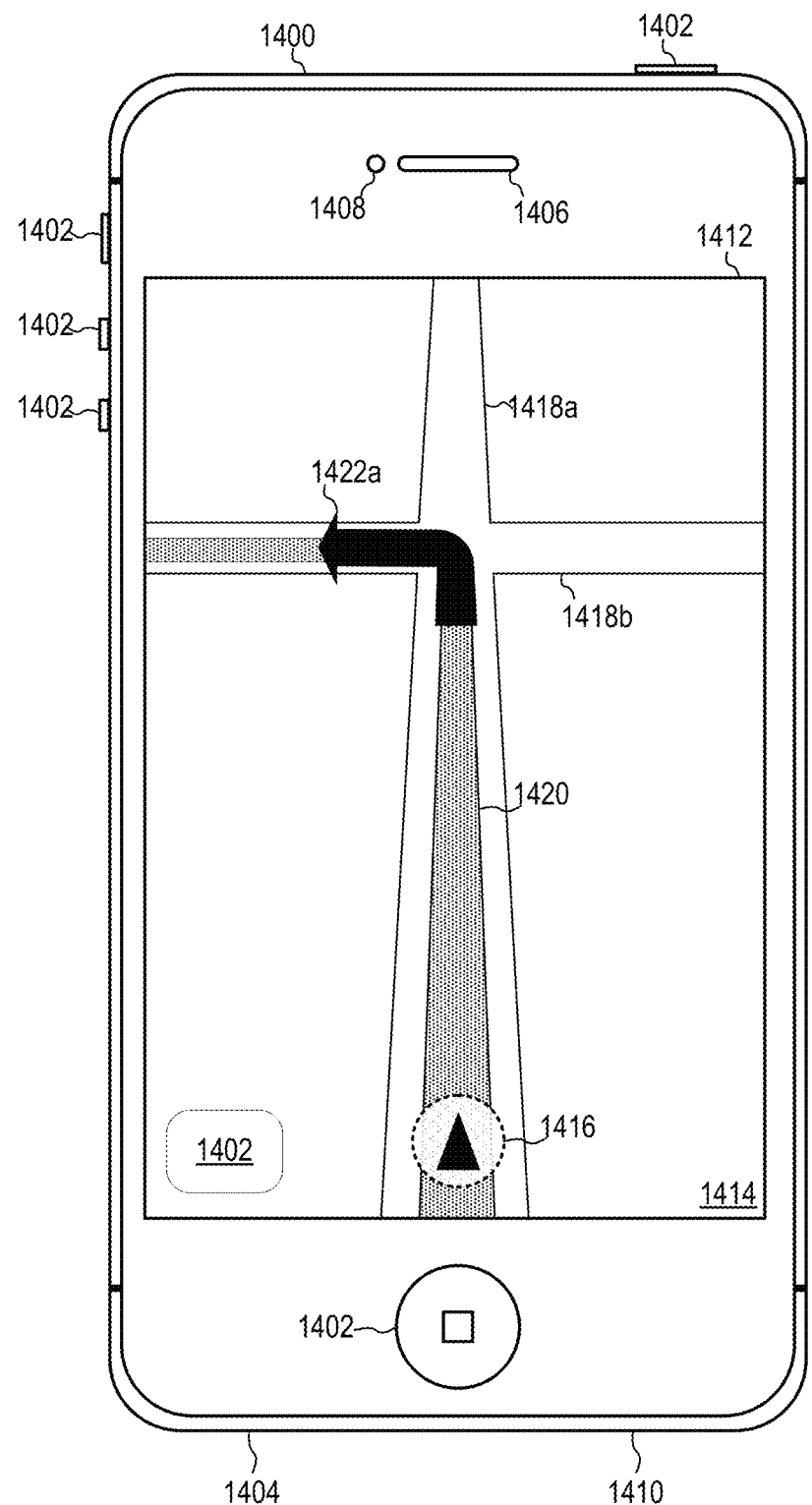
FIG. 9 illustrates an example electronic device according to some embodiments.
Figure 10:
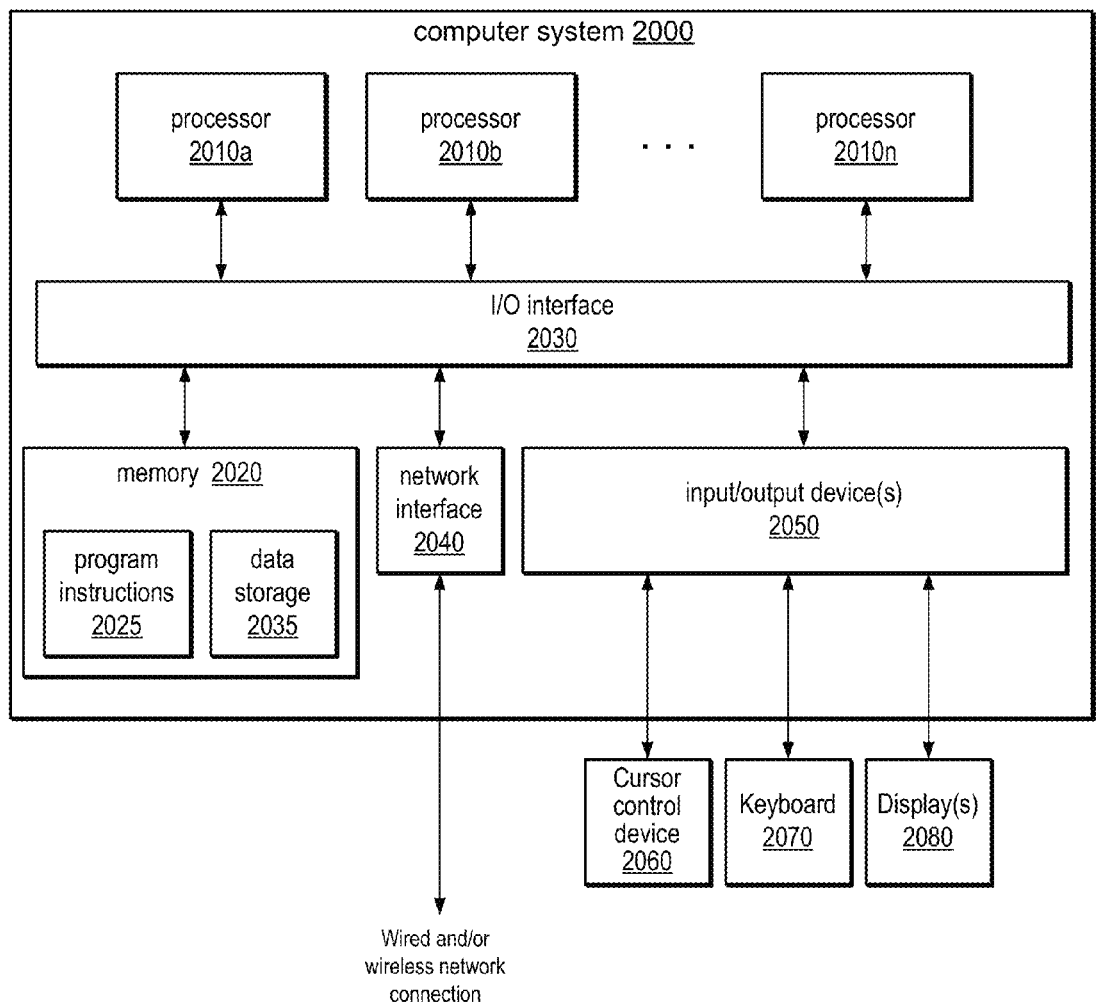
FIG. 10 illustrates an example system according to some embodiments.

Map module 500 may send the rendered map data to a display 560, such as touch-sensitive display 1012 in FIG. 9, for display. Map module 500 may send the rendered map view to a storage medium 570 for storage for later display or processing. Map module 500 may send the rendered map view to other modules 580 on the client device for further processing. For example, another module may incorporated map views rendered by map module 500 into their own module display.

Example Electronic Device

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 6:
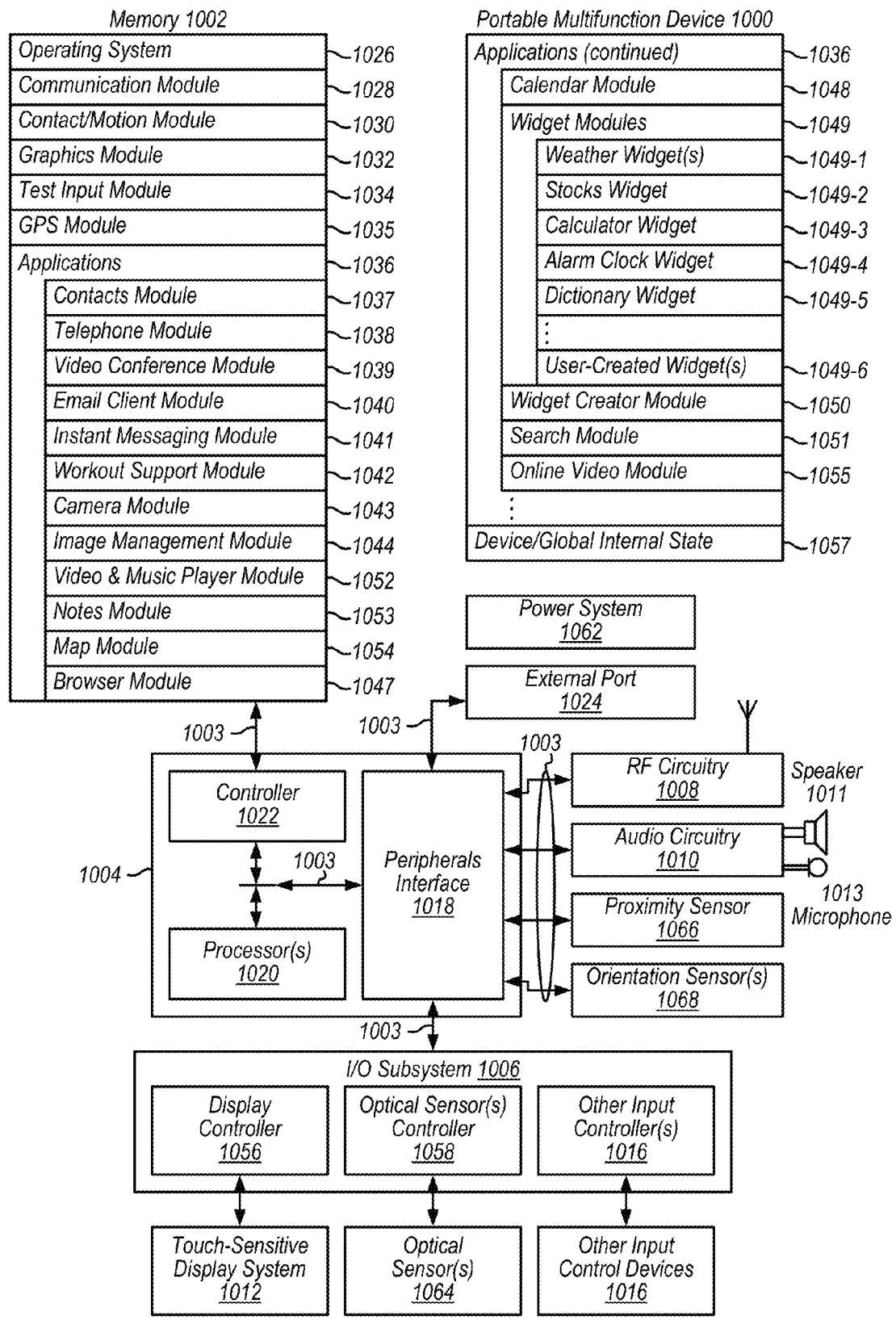
FIG. 6 illustrates an example electronic device according to some embodiments.

Attention is now directed toward embodiments of portable devices with touch-sensitive displays. FIG. 6 is a block diagram illustrating portable multifunction device 1000 with touch-sensitive displays 1012 in accordance with some embodiments. Touch-sensitive display 1012 is sometimes called a "touch screen" for convenience, and may also be known as or called a touch-sensitive display system. Device 1000 may include memory 1002 (which may include one or more computer readable storage mediums), memory controller 1022, one or more processing units (CPU's) 1020, peripherals interface 1018, RF circuitry 1008, audio circuitry 1010, speaker 1011, microphone 1013, input/output (I/O) subsystem 1006, other input or control devices 1016, and external port 1024. Device 1000 may include one or more optical sensors 1064. These components may communicate over one or more communication buses or signal lines 1003.

It should be appreciated that device 1000 is only one example of a portable multifunction device, and that device 1000 may have more or fewer components than shown, may combine two or more components, or may have a different configuration or arrangement of the components. The various components shown in FIG. 6 may be implemented in hardware, software, or a combination of both hardware and software, including one or more signal processing and/or application specific integrated circuits.

Memory 1002 may include high-speed random access memory and may also include non-volatile memory, such as one or more magnetic disk storage devices, flash memory devices, or other non-volatile solid-state memory devices. Access to memory 1002 by other components of device 1000, such as CPU 1020 and the peripherals interface 1018, may be controlled by memory controller 1022.

Peripherals interface 1018 can be used to couple input and output peripherals of the device to CPU 1020 and memory 1002. The one or more processors 1020 run or execute various software programs and/or sets of instructions stored in memory 1002 to perform various functions for device 1000 and to process data.

In some embodiments, peripherals interface 1018, CPU 1020, and memory controller 1022 may be implemented on a single chip, such as chip 1004. In some other embodiments, they may be implemented on separate chips.

RF (radio frequency) circuitry 1008 receives and sends RF signals, also called electromagnetic signals. RF circuitry 1008 converts electrical signals to/from electromagnetic signals and communicates with communications networks and other communications devices via the electromagnetic signals. RF circuitry 1008 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 1008 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of multiple communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 1010, speaker 1011, and microphone 1013 provide an audio interface between a user and device 1000. Audio circuitry 1010 receives audio data from peripherals interface 1018, converts the audio data to an electrical signal, and transmits the electrical signal to speaker 1011. Speaker 1011 converts the electrical signal to human-audible sound waves. Audio circuitry 1010 also receives electrical signals converted by microphone 1013 from sound waves. Audio circuitry 1010 converts the electrical signal to audio data and transmits the audio data to peripherals interface 1018 for processing. Audio data may be retrieved from and/or transmitted to memory 1002 and/or RF circuitry 1008 by peripherals interface 1018. In some embodiments, audio circuitry 1010 also includes a headset jack (e.g., 1212, FIG. 8). The headset jack provides an interface between audio circuitry 1010 and removable audio input/output peripherals, such as output-only headphones or a headset with both output (e.g., a headphone for one or both ears) and input (e.g., a microphone).

I/O subsystem 1006 couples input/output peripherals on device 1000, such as touch screen 1012 and other input control devices 1016, to peripherals interface 1018. I/O subsystem 1006 may include display controller 1056 and one or more input controllers 1060 for other input or control devices. The one or more input controllers 1060 receive/send electrical signals from/to other input or control devices 1016. The other input control devices 1016 may include physical buttons (e.g., push buttons, rocker buttons, etc.), dials, slider switches, joysticks, click wheels, and so forth. In some alternate embodiments, input controller(s) 1060 may be coupled to any (or none) of the following: a keyboard, infrared port, USB port, and a pointer device such as a mouse. The one or more buttons (e.g., 1208, FIG. 8) may include an up/down button for volume control of speaker 1011 and/or microphone 1013. The one or more buttons may include a push button (e.g., 1206, FIG. 8).

Touch-sensitive display 1012 provides an input interface and an output interface between the device and a user. Display controller 1056 receives and/or sends electrical signals from/to touch screen 1012. Touch screen 1012 displays visual output to the user. The visual output may include graphics, text, icons, video, and any combination thereof (collectively termed "graphics"). In some embodiments, some or all of the visual output may correspond to user-interface objects.

Touch screen 1012 has a touch-sensitive surface, sensor or set of sensors that accepts input from the user based on haptic and/or tactile contact. Touch screen 1012 and display controller 1056 (along with any associated modules and/or sets of instructions in memory 1002) detect contact (and any movement or breaking of the contact) on touch screen 1012 and converts the detected contact into interaction with user-interface objects (e.g., one or more soft keys, icons, web pages or images) that are displayed on touch screen 1012. In an exemplary embodiment, a point of contact between touch screen 1012 and the user corresponds to a finger of the user.

Touch screen 1012 may use LCD (liquid crystal display) technology, LPD (light emitting polymer display) technology, or LED (light emitting diode) technology, although other display technologies may be used in other embodiments. Touch screen 1012 and display controller 1056 may detect contact and any movement or breaking thereof using any of multiple touch sensing technologies now known or later developed, including but not limited to capacitive, resistive, infrared, and surface acoustic wave technologies, as well as other proximity sensor arrays or other elements for determining one or more points of contact with touch screen 1012. In an exemplary embodiment, projected mutual capacitance sensing technology is used, such as that found in the iPhone®, iPod Touch®, and iPad® from Apple Inc. of Cupertino, Calif.

Touch screen 1012 may have a video resolution in excess of 100 dpi. In some embodiments, the touch screen has a video resolution of approximately 1060 dpi. The user may make contact with touch screen 1012 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 1000 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 1012 or an extension of the touch-sensitive surface formed by the touch screen.

Device 1000 also includes power system 1062 for powering the various components. Power system 1062 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 1000 may also include one or more optical sensors 1064. FIG. 6 shows an optical sensor coupled to optical sensor controller 1058 in I/O subsystem 1006. Optical sensor 1064 may include charge-coupled device (CCD) or complementary metal-oxide semiconductor (CMOS) phototransistors. Optical sensor 1064 receives light from the environment, projected through one or more lens, and converts the light to data representing an image. In conjunction with imaging module 1043 (also called a camera module), optical sensor 1064 may capture still images or video. In some embodiments, an optical sensor is located on the back of device 1000, opposite touch screen display 1012 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 1000 may also include one or more proximity sensors 1066. FIG. 6 shows proximity sensor 1066 coupled to peripherals interface 1018. Alternately, proximity sensor 1066 may be coupled to input controller 1060 in I/O subsystem 1006. In some embodiments, the proximity sensor turns off and disables touch screen 1012 when the multifunction device is placed near the user's ear (e.g., when the user is making a phone call).

Device 1000 includes one or more orientation sensors 1068. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 1000. In some embodiments, the one or more orientation sensors include any combination of orientation/rotation sensors. FIG. 6 shows the one or more orientation sensors 1068 coupled to peripherals interface 1018. Alternately, the one or more orientation sensors 1068 may be coupled to an input controller 1060 in I/O subsystem 1006. In some embodiments, information is displayed on the touch screen display in a portrait view or a landscape view based on an analysis of data received from the one or more orientation sensors.

In some embodiments, the software components stored in memory 1002 include operating system 1026, communication module (or set of instructions) 1028, contact/motion module (or set of instructions) 1030, graphics module (or set of instructions) 1032, text input module (or set of instructions) 1034, Global Positioning System (GPS) module (or set of instructions) 1035, and applications (or sets of instructions) 1036. Furthermore, in some embodiments memory 1002 stores device/global internal state 1057, as shown in FIGS. 6 and 8. Device/global internal state 1057 includes one or more of: active application state, indicating which applications, if any, are currently active; display state, indicating what applications, views or other information occupy various regions of touch screen display 1012; sensor state, including information obtained from the device's various sensors and input control devices 1016; and location information concerning the device's location and/or attitude.

Operating system 1026 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 1028 facilitates communication with other devices over one or more external ports 1024 and also includes various software components for handling data received by RF circuitry 1008 and/or external port 1024. External port 1024 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 1030 may detect contact with touch screen 1012 (in conjunction with display controller 1056) and other touch sensitive devices (e.g., a touchpad or physical click wheel). Contact/motion module 1030 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 1030 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 1030 and display controller 1056 detect contact on a touchpad.

Contact/motion module 1030 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 1032 includes various known software components for rendering and displaying graphics on touch screen 1012 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 1032 stores data representing graphics to be used. Each graphic may be assigned a corresponding code. Graphics module 1032 receives, from applications etc., one or more codes specifying graphics to be displayed along with, if necessary, coordinate data and other graphic property data, and then generates screen image data to output to display controller 1056.

Text input module 1034, which may be a component of graphics module 1032, provides soft keyboards for entering text in various applications (e.g., contacts 1037, e-mail 1040, IM 1041, browser 1047, and any other application that needs text input).

GPS module 1035 determines the location of the device and provides this information for use in various applications (e.g., to telephone 1038 for use in location-based dialing, to camera 1043 as picture/video metadata, and to applications that provide location-based services such as weather widgets, local yellow page widgets, and map/navigation widgets).

Applications 1036 may include the following modules (or sets of instructions), or a subset or superset thereof:
 contacts module 1037 (sometimes called an address book or contact list);
 telephone module 1038;
 video conferencing module 1039;
 e-mail client module 1040;
 instant messaging (IM) module 1041;
 workout support module 1042;
 camera module 1043 for still and/or video images;
 image management module 1044;
 browser module 1047;
 calendar module 1048;
 widget modules 1049, which may include one or more of: weather widget 1049-1, stocks widget 1049-2, calculator widget 1049-3, alarm clock widget 1049-4, dictionary widget 1049-5, and other widgets obtained by the user, as well as user-created widgets 1049-6;
 widget creator module 1050 for making user-created widgets 1049-6;
 search module 1051;
 video and music player module 1052, which may be made up of a video player module and a music player module;
 notes module 1053;
 map module 1054; and/or
 online video module 1055.

Examples of other applications 1036 that may be stored in memory 1002 include other word processing applications, other image editing applications, drawing applications, presentation applications, JAVA-enabled applications, encryption, digital rights management, voice recognition, and voice replication.

In conjunction with touch screen 1012, display controller 1056, contact module 1030, graphics module 1032, and text input module 1034, contacts module 1037 may be used to manage an address book or contact list (e.g., stored in application internal state 1092 of contacts module 1037 in memory 1002), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 1038, video conference 1039, e-mail 1040, or IM 1041; and so forth.

In conjunction with RF circuitry 1008, audio circuitry 1010, speaker 1011, microphone 1013, touch screen 1012, display controller 1056, contact module 1030, graphics module 1032, and text input module 1034, telephone module 1038 may be used to enter a sequence of characters corresponding to a telephone number, access one or more telephone numbers in address book 1037, modify a telephone number that has been entered, dial a respective telephone number, conduct a conversation and disconnect or hang up when the conversation is completed. As noted above, the wireless communication may use any of multiple communications standards, protocols and technologies.

In conjunction with RF circuitry 1008, audio circuitry 1010, speaker 1011, microphone 1013, touch screen 1012, display controller 1056, optical sensor 1064, optical sensor controller 1058, contact module 1030, graphics module 1032, text input module 1034, contact list 1037, and telephone module 1038, videoconferencing module 1039 includes executable instructions to initiate, conduct, and terminate a video conference between a user and one or more other participants in accordance with user instructions.

In conjunction with RF circuitry 1008, touch screen 1012, display controller 1056, contact module 1030, graphics module 1032, and text input module 1034, e-mail client module 1040 includes executable instructions to create, send, receive, and manage e-mail in response to user instructions. In conjunction with image management module 1044, e-mail client module 1040 makes it very easy to create and send e-mails with still or video images taken with camera module 1043.

In conjunction with RF circuitry 1008, touch screen 1012, display controller 1056, contact module 1030, graphics module 1032, and text input module 1034, the instant messaging module 1041 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 1008, touch screen 1012, display controller 1056, contact module 1030, graphics module 1032, text input module 1034, GPS module 1035, map module 1054, and music player module 1046, workout support module 1042 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 1012, display controller 1056, optical sensor(s) 1064, optical sensor controller 1058, contact module 1030, graphics module 1032, and image management module 1044, camera module 1043 includes executable instructions to capture still images or video (including a video stream) and store them into memory 1002, modify characteristics of a still image or video, or delete a still image or video from memory 1002.

In conjunction with touch screen 1012, display controller 1056, contact module 1030, graphics module 1032, text input module 1034, and camera module 1043, image management module 1044 includes executable instructions to arrange, modify (e.g., edit), or otherwise manipulate, label, delete, present (e.g., in a digital slide show or album), and store still and/or video images.

In conjunction with RF circuitry 1008, touch screen 1012, display system controller 1056, contact module 1030, graphics module 1032, and text input module 1034, browser module 1047 includes executable instructions to browse the Internet in accordance with user instructions, including searching, linking to, receiving, and displaying web pages or portions thereof, as well as attachments and other files linked to web pages.

In conjunction with RF circuitry 1008, touch screen 1012, display system controller 1056, contact module 1030, graphics module 1032, text input module 1034, e-mail client module 1040, and browser module 1047, calendar module 1048 includes executable instructions to create, display, modify, and store calendars and data associated with calendars (e.g., calendar entries, to do lists, etc.) in accordance with user instructions.

In conjunction with RF circuitry 1008, touch screen 1012, display system controller 1056, contact module 1030, graphics module 1032, text input module 1034, and browser module 1047, widget modules 1049 are mini-applications that may be downloaded and used by a user (e.g., weather widget 1049-1, stocks widget 1049-2, calculator widget 1049-3, alarm clock widget 1049-4, and dictionary widget 1049-5) or created by the user (e.g., user-created widget 1049-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 1008, touch screen 1012, display system controller 1056, contact module 1030, graphics module 1032, text input module 1034, and browser module 1047, the widget creator module 1050 may be used by a user to create widgets (e.g., turning a user-specified portion of a web page into a widget).

In conjunction with touch screen 1012, display system controller 1056, contact module 1030, graphics module 1032, and text input module 1034, search module 1051 includes executable instructions to search for text, music, sound, image, video, and/or other files in memory 1002 that match one or more search criteria (e.g., one or more user-specified search terms) in accordance with user instructions.

In conjunction with touch screen 1012, display system controller 1056, contact module 1030, graphics module 1032, audio circuitry 1010, speaker 1011, RF circuitry 1008, and browser module 1047, video and music player module 1052 includes executable instructions that allow the user to download and play back recorded music and other sound files stored in one or more file formats, such as MP3 or AAC files, and executable instructions to display, present or otherwise play back videos (e.g., on touch screen 1012 or on an external, connected display via external port 1024). In some embodiments, device 1000 may include the functionality of an MP3 player, such as an iPod (trademark of Apple Inc.).

In conjunction with touch screen 1012, display controller 1056, contact module 1030, graphics module 1032, and text input module 1034, notes module 1053 includes executable instructions to create and manage notes, to do lists, and the like in accordance with user instructions.

In conjunction with RF circuitry 1008, touch screen 1012, display system controller 1056, contact module 1030, graphics module 1032, text input module 1034, GPS module 1035, and browser module 1047, map module 1054 may be used to receive, display, modify, and store maps and data associated with maps (e.g., driving directions; data on stores and other points of interest at or near a particular location; and other location-based data) in accordance with user instructions.

In conjunction with touch screen 1012, display system controller 1056, contact module 1030, graphics module 1032, audio circuitry 1010, speaker 1011, RF circuitry 1008, text input module 1034, e-mail client module 1040, and browser module 1047, online video module 1055 includes instructions that allow the user to access, browse, receive (e.g., by streaming and/or download), play back (e.g., on the touch screen or on an external, connected display via external port 1024), send an e-mail with a link to a particular online video, and otherwise manage online videos in one or more file formats, such as H.264. In some embodiments, instant messaging module 1041, rather than e-mail client module 1040, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 1002 may store a subset of the modules and data structures identified above. Furthermore, memory 1002 may store additional modules and data structures not described above.

In some embodiments, device 1000 is a device where operation of a predefined set of functions on the device is performed exclusively through a touch screen and/or a touchpad. By using a touch screen and/or a touchpad as the primary input control device for operation of device 1000, the number of physical input control devices (such as push buttons, dials, and the like) on device 1000 may be reduced.

The predefined set of functions that may be performed exclusively through a touch screen and/or a touchpad include navigation between user interfaces. In some embodiments, the touchpad, when touched by the user, navigates device 1000 to a main, home, or root menu from any user interface that may be displayed on device 1000. In such embodiments, the touchpad may be referred to as a "menu button." In some other embodiments, the menu button may be a physical push button or other physical input control device instead of a touchpad.

Figure 7:
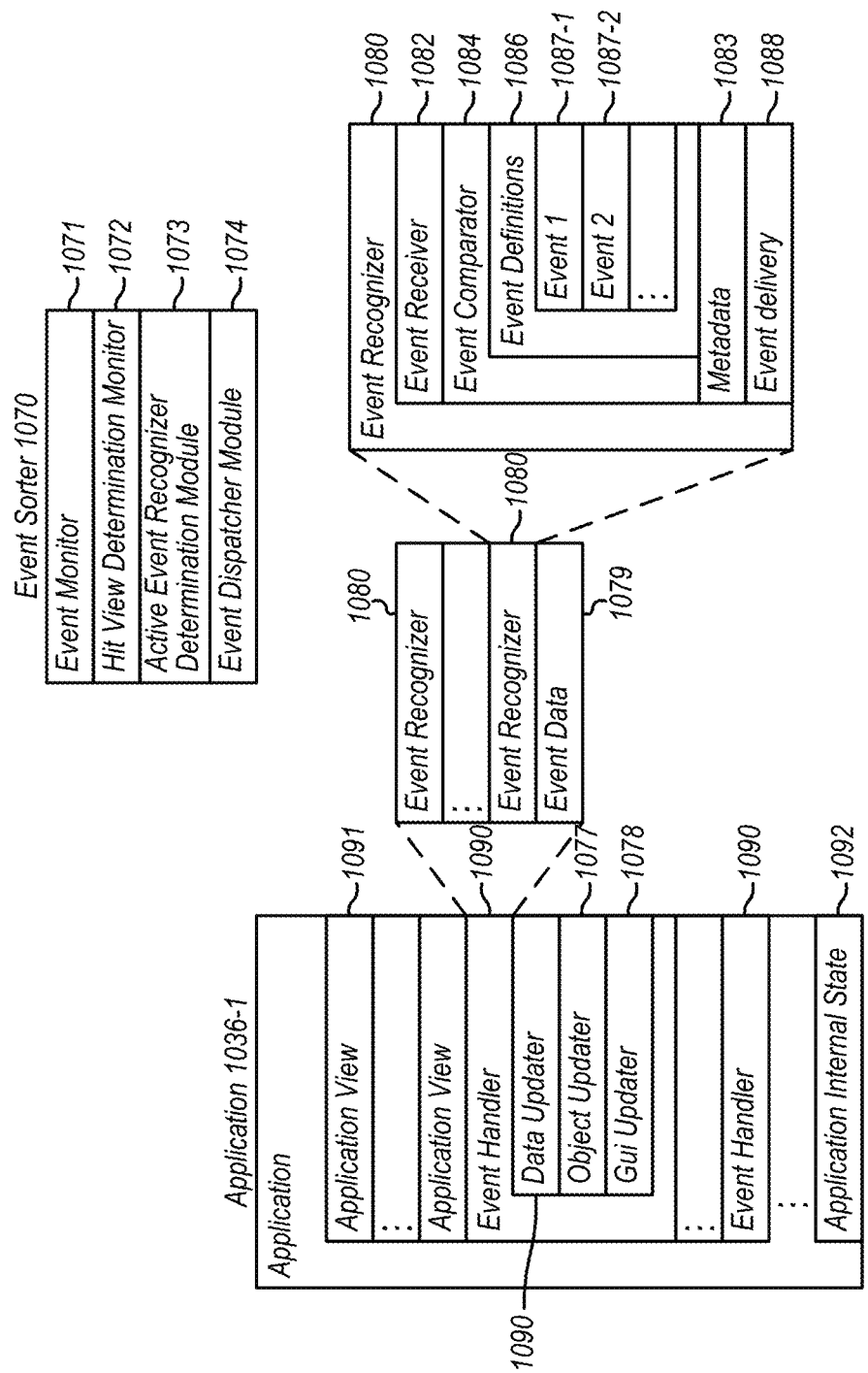
FIG. 7 illustrates an example electronic device according to some embodiments.

FIG. 7 is a block diagram illustrating exemplary components for event handling in accordance with some embodiments. In some embodiments, memory 1002 (in FIG. 7) includes event sorter 170 (e.g., in operating system 1026) and a respective application 1036-1 (e.g., any of the aforementioned applications 1037-1051, 1055).

Event sorter 1070 receives event information and determines the application 1036-1 and application view 1091 of application 1036-1 to which to deliver the event information. Event sorter 1070 includes event monitor 1071 and event dispatcher module 1074. In some embodiments, application 1036-1 includes application internal state 1092, which indicates the current application view(s) displayed on touch sensitive display 1012 when the application is active or executing. In some embodiments, device/global internal state 1057 is used by event sorter 1070 to determine which application(s)

is (are) currently active, and application internal state 1092 is used by event sorter 1070 to determine application views 1091 to which to deliver event information.

In some embodiments, application internal state 1092 includes additional information, such as one or more of: resume information to be used when application 1036-1 resumes execution, user interface state information that indicates information being displayed or that is ready for display by application 1036-1, a state queue for enabling the user to go back to a prior state or view of application 1036-1, and a redo/undo queue of previous actions taken by the user.

Event monitor 1071 receives event information from peripherals interface 1018. Event information includes information about a sub-event (e.g., a user touch on touch sensitive display 1012, as part of a multi-touch gesture). Peripherals interface 1018 transmits information it receives from I/O subsystem 1006 or a sensor, such as proximity sensor 1066, orientation sensor(s) 1068, and/or microphone 1013 (through audio circuitry 1010). Information that peripherals interface 1018 receives from I/O subsystem 1006 includes information from touch-sensitive display 1012 or a touch-sensitive surface.

In some embodiments, event monitor 1071 sends requests to the peripherals interface 1018 at predetermined intervals. In response, peripherals interface 1018 transmits event information. In other embodiments, peripheral interface 1018 transmits event information only when there is a significant event (e.g., receiving an input above a predetermined noise threshold and/or for more than a predetermined duration).

In some embodiments, event sorter 1070 also includes a hit view determination module 1072 and/or an active event recognizer determination module 1073.

Hit view determination module 1072 provides software procedures for determining where a sub-event has taken place within one or more views, when touch sensitive display 1012 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 1072 receives information related to sub-events of a touch-based gesture. When an application has multiple views organized in a hierarchy, hit view determination module 1072 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 1073 determines which view or views within a view hierarchy should receive a particular sequence of sub-events. In some embodiments, active event recognizer determination module 1073 determines that only the hit view should receive a particular sequence of sub-events. In other embodiments, active event recognizer determination module 1073 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 1080). In embodiments including active event recognizer determination module 1073, event dispatcher module 1074 delivers the event information to an event recognizer determined by active event recognizer determination module 1073. In some embodiments, event dispatcher module 1074 stores in an event queue the event information, which is retrieved by a respective event receiver module 1082.

In some embodiments, operating system 1026 includes event sorter 1070. Alternatively, application 1036-1 includes event sorter 1070. In yet other embodiments, event sorter 1070 is a stand-alone module, or a part of another module stored in memory 1002, such as contact/motion module 1030.

In some embodiments, application 1036-1 includes multiple event handlers 1090 and one or more application views 1091, each of which includes instructions for handling touch events that occur within a respective view of the application's user interface. Each application view 1091 of the application 1036-1 includes one or more event recognizers 1080. Typically, a respective application view 1091 includes multiple event recognizers 1080. In other embodiments, one or more of event recognizers 1080 are part of a separate module, such as a user interface kit (not shown) or a higher level object from which application 1036-1 inherits methods and other properties. In some embodiments, a respective event handler 1090 includes one or more of: data updater 1076, object updater 1077, GUI updater 1078, and/or event data 1079 received from event sorter 1070. Event handler 1090 may utilize or call data updater 1076, object updater 1077 or GUI updater 1078 to update the application internal state 1092. Alternatively, one or more of the application views 1091 includes one or more respective event handlers 1090. Also, in some embodiments, one or more of data updater 1076, object updater 1077, and GUI updater 1078 are included in a respective application view 1091.

A respective event recognizer 1080 receives event information (e.g., event data 1079) from event sorter 1070, and identifies an event from the event information. Event recognizer 1080 includes event receiver 1082 and event comparator 1084. In some embodiments, event recognizer 1080 also includes at least a subset of: metadata 1083, and event delivery instructions 1088 (which may include sub-event delivery instructions).

Event receiver 1082 receives event information from event sorter 1070. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 1084 compares the event information to predefined event or sub-event definitions and, based on the comparison, determines an event or sub-event, or determines or updates the state of an event or sub-event. In some embodiments, event comparator 1084 includes event definitions 1086. Event definitions 1086 contain definitions of events (e.g., predefined sequences of sub-events), for example, event 1 (1087-1), event 2 (1087-2), and others. In some embodiments, sub-events in an event 1087 include, for example, touch begin, touch end, touch movement, touch cancellation, and multiple touching. In one example, the definition for event 1 (1087-1) is a double tap on a displayed object. The double tap, for example, includes a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (1087-2) is a dragging on a displayed object. The dragging, for example, includes a touch (or contact) on the displayed object for a predetermined phase, a movement of the touch across touch-sensitive display 1012, and lift-off of the touch (touch end). In some embodiments, the event also includes information for one or more associated event handlers 1090.

In some embodiments, event definition 1087 includes a definition of an event for a respective user-interface object. In some embodiments, event comparator 1084 performs a hit test to determine which user-interface object is associated with a sub-event. For example, in an application view in which three user-interface objects are displayed on touch-sensitive display 1012, when a touch is detected on touch-sensitive display 1012, event comparator 1084 performs a hit test to determine which of the three user-interface objects is associated with the touch (sub-event). If each displayed object is associated with a respective event handler 1090, the event comparator uses the result of the hit test to determine which event handler 1090 should be activated. For example, event comparator 1084 selects an event handler associated with the sub-event and the object triggering the hit test.

In some embodiments, the definition for a respective event 1087 also includes delayed actions that delay delivery of the event information until after it has been determined whether the sequence of sub-events does or does not correspond to the event recognizer's event type.

When a respective event recognizer 1080 determines that the series of sub-events do not match any of the events in event definitions 1086, the respective event recognizer 1080 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 1080 includes metadata 1083 with configurable properties, flags, and/or lists that indicate how the event delivery system should perform sub-event delivery to actively involved event recognizers. In some embodiments, metadata 1083 includes configurable properties, flags, and/or lists that indicate how event recognizers may interact with one another. In some embodiments, metadata 1083 includes configurable properties, flags, and/or lists that indicate whether sub-events are delivered to varying levels in the view or programmatic hierarchy.

In some embodiments, a respective event recognizer 1080 activates event handler 1090 associated with an event when one or more particular sub-events of an event are recognized. In some embodiments, a respective event recognizer 1080 delivers event information associated with the event to event handler 1090. Activating an event handler 1090 is distinct from sending (and deferred sending) sub-events to a respective hit view. In some embodiments, event recognizer 1080 throws a flag associated with the recognized event, and event handler 1090 associated with the flag catches the flag and performs a predefined process.

In some embodiments, event delivery instructions 1088 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 1076 creates and updates data used in application 1036-1. For example, data updater 1076 updates the telephone number used in contacts module 1037, or stores a video file used in video player module 1045. In some embodiments, object updater 1077 creates and updates objects used in application 1036-1. For example, object updater 1076 creates a new user-interface object or updates the position of a user-interface object. GUI updater 1078 updates the GUI. For example, GUI updater 1078 prepares display information and sends it to graphics module 1032 for display on a touch-sensitive display.

In some embodiments, event handler(s) 1090 includes or has access to data updater 1076, object updater 1077, and GUI updater 1078. In some embodiments, data updater 1076, object updater 1077, and GUI updater 1078 are included in a single module of a respective application 1036-1 or application view 1091. In other embodiments, they are included in two or more software modules.

It shall be understood that the foregoing discussion regarding event handling of user touches on touch-sensitive displays also applies to other forms of user inputs to operate multifunction devices 1000 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

FIG. 8 illustrates a portable multifunction device 1000 having a touch screen 1012 in accordance with some embodiments. The touch screen may display one or more graphics within user interface (UI) 1200. In this embodiment, as well as others described below, a user may select one or more of the graphics by making a gesture on the graphics, for example, with one or more fingers 1202 (not drawn to scale in the figure) or one or more styluses 1203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 1000. In some embodiments, inadvertent contact with a graphic may not select the graphic. For example, a swipe gesture that sweeps over an application icon may not select the corresponding application when the gesture corresponding to selection is a tap.

Device 1000 may also include one or more physical buttons, such as "home" or menu button 1204. As described previously, menu button 1204 may be used to navigate to any application 1036 in a set of applications that may be executed on device 1000. Alternatively, in some embodiments, the menu button is implemented as a soft key in a GUI displayed on touch screen 1012.

In one embodiment, device 1000 includes touch screen 1012, menu button 1204, push button 1206 for powering the device on/off and locking the device, volume adjustment button(s) 1208, Subscriber Identity Module (SIM) card slot 1210, head set jack 1212, and docking/charging external port 1024. Push button 1206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 1000 also may accept verbal input for activation or deactivation of some functions through microphone 1013.

It should be noted that, although many of the following examples will be given with reference to inputs on touch screen 1012 (where the touch sensitive surface and the display are combined), a touch-sensitive surface that is separate from the display may be used instead of touch screen 1012.

Example Mapping Functionality

FIG. 9 illustrates another example of a multifunction device, which may be configured in a manner similar to the multifunction device described above. In the illustrated embodiment, a multifunction device 1400 includes a mapping application (e.g., map module 1054 described above) that may be stored in one or more memories of multifunction device 1400 and executed on one or more processors of multifunction device 1400. As is the case for the multifunction device described above, multifunction device 1400 may include one or more controls 1402 for operating the multifunction device. These controls may include but are not limited to power controls for turning the device on and off, volume controls for adjusting the ear piece volume or the speaker volume, menu controls for navigation functions of the device, and function controls for initiating one or more function or actions on the device. Controls 1402 may include hardware controls or software controls. For instance, the bottom left corner of electronic display 1412 includes a graphical representation of a control 1412 that may be selected by a user, such as by way of touch in accordance with the touch screen functionality described above. Multifunction device 1400 may also include other components similar to those described above, such as a microphone 1404, an earpiece 1406 (e.g., a speaker through which to convey audio representations of telephone calls), an optical sensor 1408, and/or a speaker 1410. Each of these components may be configured in a similar manner to those like-named components of FIG. 8 described above. Furthermore, electronic display 1412 may be configured with touch screen capability, such as touch screen 1012 described above. In various embodiments, controls (e.g., on screen control(s) 1402) may be utilized to perform any of a variety of map-related functions including but not limited to zoom in, zoom out, rotate screen, pan screen, toggle views (e.g., two-dimensions to three dimensions and vice versa), and/or another map related activity. In various embodiments, one or more gestures may be utilized to perform any of the aforesaid map controls (with or without the use of an actual graphical on-screen control). In one non-limiting example, a one figure gesture may be utilized to adjust the pitch within a three-dimensional map view.

As noted above, multifunction device 1400 includes a mapping application that may be stored in one or more memories of multifunction device 1400 and executed on one or more processors of multifunction device 1400. In the illustrated embodiment, the graphical representation of the mapping application may include a map 1414 of a geographic region. This map may be presented as a two-dimensional map or a three-dimensional map, the selection of which may be specified through, e.g., a user-configurable parameter of the mapping application. In some embodiments, the multifunction device may toggle between two-dimensional map or three-dimensional map views responsive to input from any input component of the multifunction device. In one non-limiting example, input from orientation sensor(s) 1068 may initiate the transition from a two-dimensional map view to a three-dimensional map, and vice versa. For instance, one or more of orientation sensor(s) 1068 may detect a tilt (e.g., a user-initiated tilt) in the orientation of the multifunction device and, in response, initiate the aforesaid toggling.

Map 1414 may include a graphical position indicator 1416, which may represent the location of the multifunction device within the geographic region of the map. Generally position indicator 1416 may represent the current or real-time position of the multifunction device, although it should be understood that in some cases there may exist some small amount of temporal latency between the actual position of the multifunction device and the graphical representation of that location (e.g., position indicator 1416). This may occur, e.g., when the multifunction device is in motion. In various embodiments, the multifunction device may be configured to perform map matching including but not limited to aligning a sequence of observed user positions with a road network on a digital map. In various embodiments, the multifunction device may be configured to perform a "snap to" function in which the graphical position indicator 1416 is aligned onto a roadway when the user's position falls within in a specified threshold distance of the roadway.

Furthermore, multifunction device 1400 may generally be operated by a user. For example, multifunction device 1400 may in some cases be a smartphone utilized by an individual to make phone calls, send text messages, browse the internet, etc. As use of multifunction device by an individual generally implies the individual is proximate to the multifunction device (e.g., the user may be holding the device in his or her hand), references herein to the location of the device and the location of the user may be considered to be synonymous. However, it should be understood that in some cases the actual position of the multifunction device and the user of that device may differ by some distance. For instance, the user may place his or her multifunction device on a table of an outdoor café while sitting in a nearby chair. In this case, the position of the device and the position of the user may differ by some small amount. In another example, multifunction device 1400 may be mounted on a car dashboard (e.g., for use as a navigation device) while the user of the device sits nearby (e.g., in the driver seat of the car). In this case as well, the position of the device and the position of the user may differ by some small amount. Despite these small differences in position, generally the position of the multifunction device and the position of the multifunction device user may be considered to coincide.

In various embodiments, the map 1414 displayed by the multifunction device may include one or more roads (e.g., roads 1418a-b), buildings (not illustrated), terrain features (e.g., hills, mountains) (not illustrated), parks (not illustrated), water bodies (not illustrated), and/or any other item that may be conveyed by a map. In some cases, the map may also include other map or navigation information including but not limited to readouts from one or more of a directional compass, an altimeter, and/or a thermometer.

In various embodiments, the mapping application may be configured to generate directions from an origination (e.g., an address or a user's current position) to a destination (e.g., an address, landmark, bookmarked/saved location, or point of interest). For instance, an indication of the origination and/or destination may be input into the multi-function device by the user. The multifunction device may generate one or more candidate routes between those two points. The multifunction device may select one of those routes for display on the device. In other cases, multiple candidate routes may be presented to the user and the user may select a preferred route. In the illustrated embodiment, one route is illustrated as route 1420. The route may also include turn-by-turn directions which may be presented to the user (in 2D or 3D), such as a graphical indication to perform a turn 1422*a* from road 1418*a* to road 1418*b*. In some embodiments, this graphical indication to perform a turn may be supplemented or substituted with an audible indication to turn, such as a voice command from speaker 1410 that indicates the user is to "turn left in 100 yards," for example. In some embodiments, the route that is selected may be presented to the user as a route overview. For instance, before proceeding with navigation, the multifunction device may generate a route overview display that graphically indicates key information for the route, such as key turns, route distance and/or an estimated time for traversing the route. In some cases, the multifunction device may be configured to generate a display of driving maneuvers (e.g., turns, lane changes, etc.) that occur in quick succession, either in the route overview or during actual navigation. This information may help the user safely prepare for such maneuvers. In some cases, the route information may be presented in a list format, such as a list of turns or other maneuvers.

In various embodiments, the mapping application of the multifunction device may be configured to track the position of the user over time and correspondingly adjust the graphical position indicator 1416 to indicate the new position. For instance, the mapping application may determine that the user is traveling along route 1420 from position information (e.g., information from GPS module 1035) and update the map 1414 accordingly. For instance, in some cases the map 1414 may remain stationary while position indicator 1416 is moved along the route. In other cases, position indicator 1416 may remain stationary or "fixed" while map 1414 is moved (e.g., panned, turned, etc.) around the position indicator.

In various embodiments, the multifunction device may be configured to display alternate or contingency routes. In some cases, these routes may be selectable by the user (e.g., via the touch screen interface). In other cases, the multifunction device may select a best route based on one or more parameters, such as shortest distance or time. In some cases, these parameters or preferences may be set by the user.

As described in more detail below, the multifunction device may in various embodiments receive routing information that specifies a route from a map service. In some case, the multifunction device may carry out navigation guidance in accordance with this route. However, in some cases, the multifunction device may perform a reroute operation in order to generate a new route to the destination. For instance, the user may have deviated from the original route or explicitly requested a new route. In some cases, the multifunction device may perform rerouting based on cached map data stored on the multifunction device.

In various embodiments, the multifunction device may be configured to perform route correction based on real-time data, such as updates in map information, road conditions, traffic conditions, and/or weather conditions. For instance, the multifunction device may be configured to alter a route such that the route avoids a construction zone or a dangerous storm cell.

In various embodiments, the multifunction device may be configured to perform lane guidance independently or as part of navigation guidance. For instance, the multifunction device may, in response to detecting that multiple turns follow in quick succession, provide the user with a direction or suggestion as to which lane to occupy. For instance, a voice or visual indication may specify that the user "turn right, then move to the left lane" in anticipation of a subsequent left turn. In another example, the multifunction device may detect one or more lane closures (e.g., due to construction or other reasons) and instruct the user to avoid such lanes.

In various embodiments, the multifunction device may be configured to generate voice prompts for directions. For instance, during navigation guidance, the multifunction device may be configured to generate audio representations of the next turn or driving maneuver on the route. For instance, the multifunction device may be configured to audibly indicate the user should "turn left in 100 yards" or some other audible indication of a maneuver.

In various embodiments, the multifunction device may be responsive to various voice commands for performing actions including a command to obtain a route. For instance, the multifunction device may interpret the user's voice through a microphone or other transducer of the multifunction device. The user may specify an origination and a destination for the requested route. In various embodiments, the multifunction device may be configured to utilize the user's current location as the origination for the route.

In various embodiments, the multifunction device may be configured to perform a search along a specific route, such as current navigation route. For instance, the user of the multifunction device may request the location of points of interest, such as fuel stations or restaurants. However, if a user is traveling along a particular route, they may not be particularly interested in points of interest that are not proximate to that route. As such, the multifunction device may be configured to scope any searches to points of interested within a specified distance away from the route. In various embodiments, this distance may be a configurable parameter.

In various embodiments, the multifunction device may be configured to display various graphical layers including but not limited to a graphical map information, aerial images (e.g., satellite-acquired images), and/or traffic information. For instance, in the traffic information example, the multifunction device may overlay color coded traffic information on roadways to indicate the speed at which traffic is flowing. For example, green color coding may be used to indicate traffic is flowing normally, and yellow or red may be used to indicate traffic slowdowns.

In various embodiments, the multifunction device may be configured to display any quantity of metrics or statistics about a navigation route including but not limited to an estimated time of arrival, travel distance remaining, average speed (overall or moving average), top speed, and/or other route statistics.

In various embodiments, the multifunction device may be configured to display routes at different angles in order to accommodate the preferences of different users. Such viewing angles may include a bird's eye view for two-dimensional maps to any of a variety of camera angles available for a three-dimensional map.

In various embodiments, the multifunction device may be configured to provide navigation information other than map and routing information. For instance the multifunction device may expose output from any of the hardware device described above with respect to FIG. 6. In one non-limiting example, an orientation sensor 1068 may include a compass that outputs direction data. The multifunction device described herein may be configured to display this directional data as a virtual compass, for example.

Example System

Embodiments of the method for rendering a map with adaptive textures for map features as described herein may be executed on one or more computer systems such as the map service 130, which may interact with various other devices. One such computer system is illustrated by FIG. 10. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. In some embodiments, it is contemplated that embodiments may be implemented using a single instance of computer system 2000, while in other embodiments multiple such systems, or multiple nodes making up computer system 2000, may be configured to host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-client device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may be configured to store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of the method for rendering a map according to a stylesheet as described herein are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a computer-accessible medium may include storage media or memory media such as magnetic or optical media, e.g., disk or CD/DVD-ROM coupled to computer system 2000 via I/O interface 2030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 10, memory 2020 may include program instructions 2025, configured to implement embodiments of the method for rendering a map with adaptive textures for map features as described herein, and data storage 2035, comprising various data accessible by program instructions 2025. In one embodiment, program instructions 2025 may include software elements of embodiments of the method for rendering a map with adaptive textures for map features, as illustrated in FIG. 5. Data storage 2035 may include data that may be used in embodiments. In other embodiments, other or different software elements and data may be included.

Those skilled in the art will appreciate that computer system 2000 is merely illustrative and is not intended to limit the scope of the method for rendering a map according to a stylesheet as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

What is claimed is:

1. A method, comprising:
  performing, by a computing device:
    for a portion of map data including a feature of a given feature type:
      specifying, for the feature, a level-of-detail texture from among a plurality of level-of-detail textures for the given feature type, wherein said plurality of level-of-detail textures has an order according to level-of-detail, and wherein each of the plurality of level-of detail textures has the same pixel dimensions; and
    rendering the portion of map data, wherein said rendering comprises:
      providing, to a rendering unit, the specified level-of-detail texture with a mipmap chain for the specified level of-detail texture;
      wherein the mipmap chain for the specified level-of-detail texture comprises the specified level of detail texture and a portion of another one of the plurality of level-of-detail textures adjacent to the specified level-of-detail texture in said order, wherein the portion of the other one of the level-of-detail textures adjacent to the specified level-of-detail texture has pixel dimensions that are less than the pixel dimensions of the plurality of level of detail textures.

2. The method of claim 1, further comprising obtaining the map data from a server by a map application.

3. The method of claim 1, further comprising:
  generating the mipmap chain for the specified level-of-detail texture, comprising:
    selecting the specified level-of-detail texture as the lowest level in the mipmap chain; and
    cropping the other one of the plurality of level-of-detail textures adjacent to the specified level-of-detail texture in said order to obtain the portion for the next lowest level in the mipmap chain.

4. The method of claim 1, wherein the mipmap chain comprises the specified level-of-detail texture as the lowest level in the mipmap chain and the portion of the other one of the plurality of level-of-detail textures as the next lowest level in the mipmap chain,
  wherein the rendering unit blends, based on spatial information for a portion of the feature being rendered, texture data from the lowest and next lowest levels in the mipmap chain.

5. The method of claim 4, wherein the portion of map data is a particular map tile, and wherein for an adjacent map tile including the feature, the method further comprises:
  specifying, for the feature in the adjacent map tile, the other level-of-detail texture adjacent to the specified level-of-detail texture in said order.

6. The method of claim 5, wherein one part of the feature rendered for the particular map tile connects to another part of the feature rendered for the adjacent map tile, wherein the one part of the feature is rendered from the next lowest level in the mipmap chain including the portion of the other one of the plurality of level-of-detail textures, and wherein the other part of the feature is rendered from the other one of the plurality of level-of-detail textures such that the rendered texture for the feature matches across a boundary between the particular map tile and the adjacent map tile.

7. A system, comprising:
  a memory; and
  one or more processors coupled to the memory, wherein the memory comprises program instructions executable by the one or more processors to:
    for a portion of map data including a feature of a given feature type:
      specify, for the feature, a level-of-detail texture from among a plurality of level-of-detail textures for the given feature type, and wherein said plurality of level-of-detail textures has an order according to level-of-detail, wherein each of the plurality of level-of detail textures have the same pixel dimensions; and render the portion of map data, wherein said rendering comprises:

provide, to a rendering unit, the specified level-of-detail texture with a mipmap chain for the specified level of-detail texture;

wherein the mipmap chain for the specified level-of-detail texture comprises the specified level-of-detail texture and a portion of another one of the plurality of level-of-detail textures adjacent to the specified level-of-detail texture in said order, wherein the portion of the other one of the level-of-detail textures adjacent to the specified level-of-detail texture has pixel dimensions that are less than the pixel dimensions of the plurality of level of detail textures.

8. The system of claim 7, wherein the rendered portion of map data is rendered for display on the system, and wherein the program instructions are further executable by the one or more processors to display the rendered portion of map data on a display device.

9. The system of claim 7, wherein the program instructions are further executable by the one or more processors to:

generate the mipmap chain for the specified level-of-detail texture, comprising:

select the specified level-of-detail texture as the lowest level in the mipmap chain; and crop the other one of the plurality of level-of-detail textures adjacent to the specified level-of-detail texture in said order to obtain the portion for the next lowest level in the mipmap chain.

10. The system of claim 7, wherein the mipmap chain comprises the specified level-of-detail texture as the lowest level in the mipmap chain and the portion of the other one of the plurality of level-of-detail textures as the next lowest level in the mipmap chain, wherein the rendering unit blends, based on spatial information for a portion of the feature being rendered, texture data from the lowest and next lowest levels in the mipmap chain.

11. The system of claim 10, wherein the portion of map data is a particular map tile, and wherein for an adjacent map tile including the feature, the program instructions are further executable by the one or more processors to:

specify, for the feature in the adjacent map tile, the other level-of-detail texture adjacent to the specified level-of-detail texture in said order.

12. The system of claim 11, wherein one part of the feature rendered for the particular map tile connects to another part of the feature rendered for the adjacent map tile, wherein the one part of the feature is rendered from the next lowest level in the mipmap chain including the portion of the other one of the plurality of level-of-detail textures, and wherein the other part of the feature is rendered from the other one of the plurality of level-of-detail textures such that the rendered texture for the feature matches across a boundary between the particular map tile and the adjacent map tile.

13. A non-transitory, computer-readable storage medium, storing program instructions computer-executable on a computer to implement a map application configured to implement:

for a portion of map data including a feature of a given feature type:

specifying, for the feature, a level-of-detail texture from among a plurality of level-of-detail textures for the given feature type, and wherein said plurality of level-of-detail textures has an order according to level-of-detail, wherein each of the plurality of level-of detail textures have the same pixel dimensions; and rendering the portion of map data, wherein said rendering comprises:

providing, to a rendering unit, the specified level-of-detail texture with a mipmap chain for the specified level-of-detail texture, wherein the rendering unit blends, based on spatial information for a portion of the feature being rendered, texture data from the lowest and next lowest levels in the mipmap chain;

wherein the mipmap chain for the specified level-of-detail texture comprises the specified level-of-detail texture as the lowest level in the mipmap chain and a portion of another one of the plurality of level-of-detail textures adjacent to the specified level-of-detail texture in said order as the next lowest level in the mipmap chain wherein the portion of the other one of the level-of-detail textures adjacent to the specified level-of-detail texture has pixel dimensions that are less than the pixel dimensions of the plurality of level of detail textures.

14. The medium of claim 13, wherein the rendered portion of map data is rendered for display on the system, and wherein the map application is further configured to implement displaying the rendered portion of map data on a display device.

15. The medium of claim 13, wherein the portion of map data is a particular map tile, and wherein for an adjacent map tile including the feature, the map application is further configured to implement:

specifying, for the feature in the adjacent map tile, the other level-of-detail texture adjacent to the specified level-of-detail texture in said order.

16. The medium of claim 15, wherein one part of the feature rendered for the particular map tile connects to another part of the feature rendered for the adjacent map tile, wherein the one part of the feature is rendered from the next lowest level in the mipmap chain including the portion of the other one of the plurality of level-of-detail textures, and wherein the other part of the feature is rendered from the other one of the plurality of level-of-detail textures such that the rendered texture for the feature matches across a boundary between the particular map tile and the adjacent map tile.

17. A multifunction device, comprising:

a touch-sensitive display;

at least one processor; and a memory comprising program instructions, wherein the program instructions implement a map application executable by the at least one processor to:

for a portion of map data including a feature of a given feature type:

specify, for the feature, a level-of-detail texture from among a plurality of level-of-detail textures for the given feature type, and wherein said plurality of level-of-detail textures has an order according to level-of-detail, wherein each of the plurality of level-of detail textures have the same pixel dimensions; and render the portion of map data for display on the touch-sensitive display, wherein said rendering comprises:

provide, to a rendering unit, the specified level-of-detail texture with a mipmap chain for the specified level-of-detail texture, wherein the rendering unit blends, based on spatial information for a portion of the feature being rendered, texture data from the lowest and next lowest levels in the mipmap chain;

wherein the mipmap chain for the specified level-of-detail texture comprises the specified level-of-detail texture as the lowest level in the mipmap chain and a portion of another one of the plurality of level-of-detail textures adjacent to the specified level-of-detail texture in said order as the next lowest level in the mipmap chain, wherein the portion of the other one of the level-of-detail textures adjacent to the specified level-of-detail texture has pixel dimensions that are less than the pixel dimensions of the plurality of level of detail textures.

18. The multifunction device of claim 17, wherein the program instructions implementing the map application are further executable by the at least one processor to obtain the map data from a server.

19. The multifunction device of claim 17, wherein the portion of map data is a particular map tile, and wherein for an adjacent map tile including the feature, the program instructions implementing the map application are further executable by the at least one processor to:

specify, for the feature in the adjacent map tile, the other level-of-detail texture adjacent to the specified level-of-detail texture in said order.

20. The multifunction device of claim 19, wherein one part of the feature rendered for the particular map tile connects to another part of the feature rendered for the adjacent map tile, wherein the one part of the feature is rendered from the next lowest level in the mipmap chain including the portion of the other one of the plurality of level-of-detail textures, and wherein the other part of the feature is rendered from the other one of the plurality of level-of-detail textures such that the rendered texture for the feature matches across a boundary between the particular map tile and the adjacent map tile.

21. The multifunction device of claim 20, wherein the program instructions implementing the map application are further executable by the at least one processor to display the particular map tile and the adjacent map tile.

22. An electronic device, comprising:
an electronic display;
a rendering component; and
a map component, implemented by one or more processors, configured to:
for a portion of map data including a feature of a given feature type:
specify, for the feature, a level-of-detail texture from among a plurality of level-of-detail textures for the given feature type, and wherein said plurality of level-of-detail textures has an order according to level-of-detail, wherein each of the plurality of level-of-detail textures have the same pixel dimensions; and
render the portion of map data for display on the electronic display, wherein said rendering comprises:
provide, to the rendering component, the specified level-of-detail texture with a mipmap chain for the specified level-of-detail texture, wherein the rendering component blends, based on spatial information for a portion of the feature being rendered, texture data from the lowest and next lowest levels in the mipmap chain;
wherein the mipmap chain for the specified level-of-detail texture comprises the specified level-of-detail texture as the lowest level in the mipmap chain and a portion of another one of the plurality of level-of-detail textures adjacent to the specified level-of-detail texture in said order as the next lowest level in the mipmap chain, wherein the portion of the other one of the level-of-detail textures adjacent to the specified level-of-detail texture has pixel dimensions that are less than the pixel dimensions of the plurality of level of detail textures.

23. The device of claim 22, wherein the map component is further configured to:
generate the mipmap chain for the specified level-of-detail texture, comprising:
select the specified level-of-detail texture as the lowest level in the mipmap chain; and
crop the other one of the plurality of level-of-detail textures adjacent to the specified level-of-detail texture in said order to obtain the portion for the next lowest level in the mipmap chain.

24. The device of claim 22, wherein the portion of map data is a particular map tile, and wherein for an adjacent map tile including the feature, the map component is further configured to:
specify, for the feature in the adjacent map tile, the other level-of-detail texture adjacent to the specified level-of-detail texture in said order.

25. The device of claim 24, wherein one part of the feature rendered for the particular map tile connects to another part of the feature rendered for the adjacent map tile, wherein the one part of the feature is rendered from the next lowest level in the mipmap chain including the portion of the other one of the plurality of level-of-detail textures, and wherein the other part of the feature is rendered from the other one of the plurality of level-of-detail textures such that the rendered texture for the feature matches across a boundary between the particular map tile and the adjacent map tile.

* * * * *